United States Patent
Lee et al.

(10) Patent No.: US 10,154,287 B2
(45) Date of Patent: *Dec. 11, 2018

(54) VIDEO ENCODING METHOD AND APPARATUS USING TRANSFORMATION UNIT OF VARIABLE TREE STRUCTURE, AND VIDEO DECODING METHOD AND APPARATUS

(71) Applicant: SAMSUNG ELECTRONICS CO., LTD., Suwon-si (KR)

(72) Inventors: Tammy Lee, Seoul (KR); Woo-jin Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/499,336

(22) Filed: Apr. 27, 2017

(65) Prior Publication Data
US 2017/0230689 A1    Aug. 10, 2017

Related U.S. Application Data

(63) Continuation of application No. 13/817,724, filed as application No. PCT/KR2011/006037 on Aug. 17, 2011, now Pat. No. 9,674,553.
(Continued)

(51) Int. Cl.
*H04N 19/61* (2014.01)
*H04N 19/176* (2014.01)
(Continued)

(52) U.S. Cl.
CPC .......... *H04N 19/61* (2014.11); *H04N 19/119* (2014.11); *H04N 19/122* (2014.11);
(Continued)

(58) Field of Classification Search
None
See application file for complete search history.

(56) References Cited

U.S. PATENT DOCUMENTS 5,724,451 A    3/1998 Shin et al.
5,748,786 A    5/1998 Zandi et al.
(Continued)

FOREIGN PATENT DOCUMENTS

CN    1247670 A    3/2000
CN    1736103 A    2/2006
(Continued)

OTHER PUBLICATIONS

Communication dated Sep. 26, 2017, from the State Intellectual Property Office of People's Republic of China in counterpart Application No. 201510192536.2.
(Continued)

*Primary Examiner* — David J Czekaj
*Assistant Examiner* — Tyler W. Sullivan
(74) *Attorney, Agent, or Firm* — Sughrue Mion, PLLC

(57) ABSTRACT

A video encoding method is provided. The method includes: encoding a current region of a video by performing a transformation on the current region by using transformation units in a variable tree-structure which are determined from among transformation units that are hierarchically split from a base transformation unit with respect to the current region and which are generated based on a maximum split level of a transformation unit. The method further includes outputting encoded data of the current region, information about an encoding mode, and transformation-unit hierarchical-structure information including maximum size information and minimum size information of the transformation unit with respect to the video.

14 Claims, 19 Drawing Sheets

PARTITION

BASE TRANSFORMATION UNIT

Related U.S. Application Data

(60) Provisional application No. 61/374,348, filed on Aug. 17, 2010.

(51) Int. Cl.
*H04N 19/119* (2014.01)
*H04N 19/46* (2014.01)
*H04N 19/122* (2014.01)
*H04N 19/96* (2014.01)
*H04N 19/44* (2014.01)
*H04N 19/60* (2014.01)
*H04N 19/136* (2014.01)
*H04N 19/169* (2014.01)
*H04N 19/172* (2014.01)
*H04N 19/174* (2014.01)

(52) U.S. Cl.
CPC ......... *H04N 19/136* (2014.11); *H04N 19/172* (2014.11); *H04N 19/174* (2014.11); *H04N 19/176* (2014.11); *H04N 19/1883* (2014.11); *H04N 19/44* (2014.11); *H04N 19/46* (2014.11); *H04N 19/60* (2014.11); *H04N 19/96* (2014.11)

(56) References Cited

U.S. PATENT DOCUMENTS

| | | | |
|---|---|---|---|
| 6,084,908 | A | 7/2000 | Chiang et al. |
| 6,243,497 | B1 | 6/2001 | Chiang et al. |
| 6,301,301 | B1 | 10/2001 | Isu et al. |
| 6,553,071 | B1 | 4/2003 | Kim et al. |
| 7,298,910 | B2 | 11/2007 | Fukuhara et al. |
| 7,634,145 | B2 | 12/2009 | Keith et al. |
| 8,345,762 | B2 | 1/2013 | Vieron et al. |
| 8,374,241 | B2 | 2/2013 | Chen et al. |
| 8,792,561 | B2 | 7/2014 | Min et al. |
| 8,792,741 | B2 | 7/2014 | Lee et al. |
| 8,923,641 | B2 | 12/2014 | Cheon et al. |
| 8,971,652 | B2 | 3/2015 | Drugeon et al. |
| 9,699,449 | B2 * | 7/2017 | Lim ............... H04N 19/176 |
| 2005/0114093 | A1 | 5/2005 | Cha et al. |
| 2006/0062302 | A1 | 4/2006 | Yin et al. |
| 2006/0251330 | A1 | 11/2006 | Toth et al. |
| 2007/0147503 | A1 | 6/2007 | Ikeda et al. |
| 2009/0096643 | A1 | 4/2009 | Chang |
| 2009/0196517 | A1 | 8/2009 | Escoda et al. |
| 2010/0061450 | A1 | 3/2010 | Sato et al. |
| 2010/0086029 | A1 | 4/2010 | Chen et al. |
| 2011/0170593 | A1 | 7/2011 | Kim et al. |
| 2011/0292999 | A1 | 12/2011 | Jeong et al. |
| 2012/0020580 | A1 | 1/2012 | Sasai et al. |
| 2012/0140815 | A1 | 6/2012 | Zhou et al. |
| 2012/0288007 | A1 | 11/2012 | Lee et al. |
| 2013/0003855 | A1 | 1/2013 | Park et al. |
| 2013/0028331 | A1 | 1/2013 | Min et al. |
| 2013/0148739 | A1 | 6/2013 | Lee et al. |
| 2015/0172720 | A1 | 2/2015 | Lee et al. |
| 2015/0163514 | A1 | 6/2015 | Lee et al. |
| 2015/0163515 | A1 | 6/2015 | Lee et al. |
| 2015/0172721 | A1 | 6/2015 | Lee et al. |
| 2015/0326879 | A1 | 11/2015 | Alshina et al. |

FOREIGN PATENT DOCUMENTS

| | | |
|---|---|---|
| CN | 101207810 A | 6/2008 |
| CN | 101771868 A | 7/2010 |
| CN | 102934436 A | 2/2013 |
| EP | 2608539 A2 | 6/2013 |
| EP | 2 629 528 A2 | 8/2013 |
| EP | 2955917 A1 | 12/2015 |
| JP | 8-111869 A | 4/1996 |
| JP | 2000-511366 A | 8/2000 |
| JP | 2005-304056 A | 10/2005 |
| JP | 2006-513636 A | 4/2006 |
| JP | 2007-266748 A | 10/2007 |
| JP | 2008-530927 A | 8/2008 |
| JP | 2015-149777 A | 8/2015 |
| JP | 2015-149778 A | 8/2015 |
| JP | 2015-164337 A | 9/2015 |
| JP | 2015-164338 A | 9/2015 |
| KR | 10-2011-0084121 A | 7/2011 |
| KR | 1020110084121 | 7/2011 |
| RU | 2008136913 A | 3/2010 |
| WO | 97/17797 A2 | 5/1997 |
| WO | 2009/051719 A2 | 4/2009 |
| WO | 2009/090884 A1 | 7/2009 |
| WO | 2010/002214 A2 | 1/2010 |
| WO | 2010/039733 A2 | 4/2010 |
| WO | 2010/087157 A1 | 8/2010 |
| WO | 2011/087271 A2 | 7/2011 |
| WO | 2012/023796 A2 | 2/2012 |
| WO | 2012/061298 A1 | 5/2012 |

OTHER PUBLICATIONS

Communication dated Aug. 22, 2017, from the State Intellectual Property Office of People's Republic of China in counterpart Application No. 201510218965.2.

Communication dated Aug. 18, 2017, from the State Intellectual Property Office of People's Republic of China in counterpart Application No. 201510217405.5.

Communication dated Aug. 1, 2017, from the State Intellectual Property Office of People's Republic of China in counterpart Application No. 201510218546.9.

Communication dated Mar. 16, 2012 issued in International Application No. PCT/KR2011/006037 (PCT/ISA/210).

Communication dated Mar. 16, 2012 issued in International Application No. PCT/KR2011/006037 (PCT/ISA/237).

Winken, et al., "Description of video coding technology proposal by Fraunhofer HHI", Joint Collaboration Team on Video Coding (JCT-VC) of ITU-T SG16 WP3 and ISO/IEC JTC1/SC29/WGG11, Apr. 2010, pp. 1-44.

Winken, et al., "Video Coding Technology Proposal by Fraunhofer HHI", JCTV-A116, Fraunhofer Institute for Telecommunications, 28 pgs total.

Communication, dated Feb. 6, 2014, issued by the Australian Patent Office in counterpart Australian Patent Application No. 2011292589.

Communication, dated Mar. 11, 2014, issued by the Japanese Patent Office in counterpart Japanese Patent Application No. 2013-524791.

Bossen, Frank, "Common test conditions and software reference configurations," JCT-VC of ITU-T SG16 WP3 and ISO/IEC JTC1/SC29/WG11, Document JCTVC-B300, Jul. 21-28, 2010, pp. 1-12.

Lee, Bumshik, et al., "Hierarchical Variable-sized Block Transforms," JCT-VC of ITU-T SG16 WP3 and ISO/IEC JTC1/SC29/WG11, Document JCTVC-B050, Jul. 21-28, 2010, pp. 1-9.

Lee, Bumshik, et al., "Variable Block Size Transforms with Higher Order Kernels for (Ultra) High Definition Video Coding," Proc. of SPIE-IS&T Electronic Imaging, Visual Information Processing and Communication, SPIE vol. 7543, pp. 1-9, 2010.

Communication dated Nov. 10, 2014, issued by the Russian Patent Office in Russian Application No. 2013111832.

Communication dated Jan. 5, 2015, issued by the Canadian Intellectual Property Office in Canadian Application No. 2,808,587.

Communication dated Mar. 13, 2015, issued by the Korean Intellectual Property Office in counterpart application No. 10-2011-0081817.

Communication dated Mar. 10, 2015, issued by the Australian Patent Office in counterpart application No. 2011292589.

Bross, Benjamin et al., "WD4: Working Draft 4 of High-Efficiency Video Coding", Joint Collaborative Team on Video Coding (JCT-VC) of ITU-T SG16 WP3 and ISO/IEC JTC1/SC29/WG11 6th Meeting, Torino, Italy, Jul. 14-22, 2011, 229 pages total.

Communication dated Aug. 13, 2015 issued by the State Intellectual Property Office of the People's Republic of China in counterpart Chinese Application No. 201180049473.5.

Communication dated Jun. 17, 2015 issued by Ministry of Law and Human Rights of Republik of Indonesia Directorate General of

(56) References Cited

OTHER PUBLICATIONS

Intellectual Property Rights in counterpart Indonesian Patent Application No. W00201301101.
Communication dated Aug. 21 2015 issued by European Patent Office in counterpart European Application No. 11818396.1.
Anonymous, "Test Model Under Consideration", JCT-VC 2nd Meeting, Jul. 21-28, 2010, 152 pages total, No. JCTVC-B205, Geneva, CH.
Communication dated Sep. 4, 2015 issued by European Patent Office in counterpart European Application No. 15173395.3.
Communication dated Sep. 4, 2015 issued by European Patent Office in counterpart European Application No. 15173403.5.
Communication dated Sep. 4, 2015 issued by European Patent Office in counterpart European Application No. 15173411.8.
Communication dated Sep. 4, 2015 issued by European Patent Office in counterpart European Patent Application No. 15173416.7.
Zhou et al., "Proposed low complexity video encoder settings for HEVC", JCT-VC 2nd Meeting, Jul. 21-28, 2010, 5 pages total, No. JCTVC-B054, Geneva, CH.
Wiegand et al., "BoG report: residual quadtree structure", JCT-VC 3rd Meeting, Oct. 7-15, 2010, 17 pages total, No. JCTVC-C319, Guangzhou, CN.
Han., "Improved configurability residual quadtree", Aug. 11, 2010, 4 pages total, XP 2743319.
Communication dated Dec. 2, 2015, from the State Intellectual Property Office of People's Republic of China in counterpart Application No. 201510194842.X.
Communication dated Dec. 3, 2015, from the State Intellectual Property Office of People's Republic of China in counterpart Application No. 201510192536.2.
Communication dated Jan. 12, 2016, from the Japanese Patent Office in counterpart application No. 2015-084542.
Communication dated Jan. 12, 2016, from the Japanese Patent Office in counterpart application No. 2015-084543.
Communication dated Jan. 12, 2016, from the Japanese Patent Office in counterpart application No. 2015-084540.
Communication dated Jan. 12, 2016, from the Japanese Patent Office in counterpart application No. 2015-084541.
Office Action (Patent Examination Report) dated Jan. 25, 2016, issued by the Australian Patent Office in counterpart Australian Application No. 2015203104.
Office Action (Patent Examination Report) dated Jan. 25, 2016, issued by the Australian Patent Office in counterpart Australian Application No. 2015203103.
Anonymous: "Test Model under Consideration", Joint Collaborative Team on Video Coding (JCT-VC) of ITU-T SG16 WP3 and ISO/IEC JTC1/SC29/WG11, 1st Meeting: Dresden, DE, Apr. 15-23, 2010 Document—JCTVC-A205 (30 Pages Total).
Communication dated Jul. 19, 2016, issued by the Korean Intellectual Property Office in counterpart Korean Application No. 10-2015-0086610.
Communication dated Jul. 19, 2016, issued by the Korean Intellectual Property Office in counterpart Korean Application No. 10-2015-0086611.
Communication dated Jul. 19, 2016, issued by the Korean Intellectual Property Office in counterpart Korean Application No. 10-2015-0086612.
Communication dated Aug. 29, 2016, issued by the Korean Intellectual Property Office in counterpart Korean Application No. 10-2014-0148761.
Communication dated Jun. 30, 2016, issued by the State Intellectual Property Office of P.R. China in counterpart Chinese Application No. 201510192536.2.
Communication dated Sep. 6, 2016, issued by the Russian Intellectual Property Office in counterpart Russian Application No. 2015108071/08.
Communication dated Sep. 6, 2016, issued by the Russian Intellectual Property Office in counterpart Russian Application No. 2015108065/08.
Communication dated Sep. 6, 2016, issued by the Russian Intellectual Property Office in counterpart Russian Application No. 2015108082/08.
Communication dated Sep. 6, 2016, issued by the Russian Intellectual Property Office in counterpart Russian Application No. 2015108062/08.
Ken McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, 1st Meeting: Dresden, DE, Apr. 15-23, 2010, Document: JCTVC-A124, Total 40 pages.
Communication dated Jan. 24, 2017, issued by the Korean Intellectual Property Office in counterpart Korean application No. 10-2015-0086610.
Communication dated Dec. 2, 2016, issued by the State Intellectual Property Office of P.R. China in counterpart Chinese application No. 201510192536.2.
HM Software Manual—High Efficiency Video Coding (HEVC) from: https://www.google.com/url?sa=t&rct=j&q=&esrc=s&source=web&cd=1&cad=rja&uact=8&ved=0ahUKEwim19DJx6LMAhWJ1B4KHRdLAOQQFggfMAA&url=https%3A%2F%2Fhevc.hhi.fraunhofer.de%2Ftrac%2Fhevc%2Fexport%2FHEAD%2Ftrunk%2Fdoc%2Fsoftware-manual.tex&usg=AFQjCNEdjt8t6z1STFVjHfLVXJVFdjr1 DA dated Feb. 12, 2010.
Yih Han Tan et al., "Intra-prediction with Adaptive Sub-sampling", Joint Collaborative Team on Video Coding (JCT-VC) of ITU-T SG16 WP3 and ISO/IEC JTC1/SC29/WG11, 2nd Meeting, Geneva, Switzerland, JCTVC-B025, Jul. 28, 2010, 13 pages.
Search Report dated Mar. 12, 2018, issued by the Korean Intellectual Property Office in counterpart United Arab Emirates application No. 165/2013.
Examination Report dated Mar. 12, 2018, issued by the Korean Intellectual Property Office in counterpart United Arab Emirates application No. 165/2013.
Communication dated May 15, 2018 by the Indonesia Intellectual Property Office in counterpart Indonesian Patent Application No. P00201505305.
Communication dated Oct. 12, 2018, issued by the Indian Patent Office in counterpart Indian Application No. 1919/CHENP/2013.
Communication dated Aug. 7, 2018, from the Indonesian Patent Office in counterpart application No. P00201505300.
Communication dated Aug. 1, 2018, from the State Intellectual Property Office of People's Republic of China in counterpart Application No. 201510192536.2.

\* cited by examiner

PARTITION    BASE TRANSFORMATION UNIT

PARTITION    LEVEL 0    LEVEL 1

FIG. 19
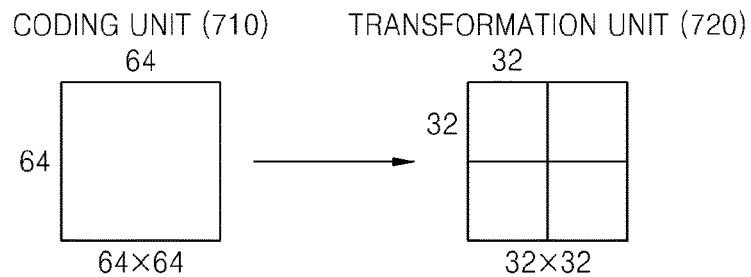
FIG. 20
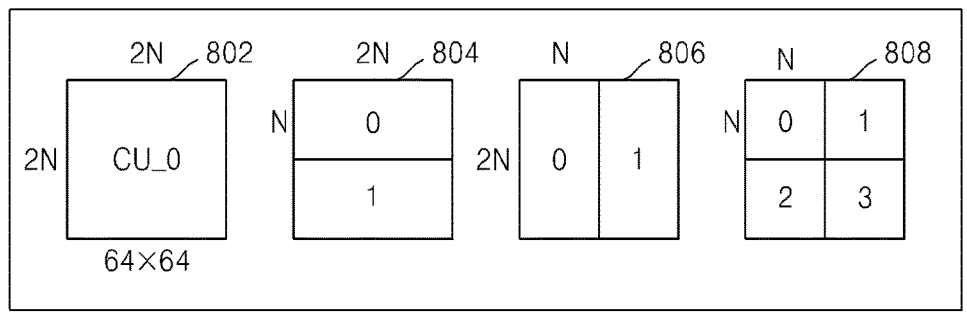
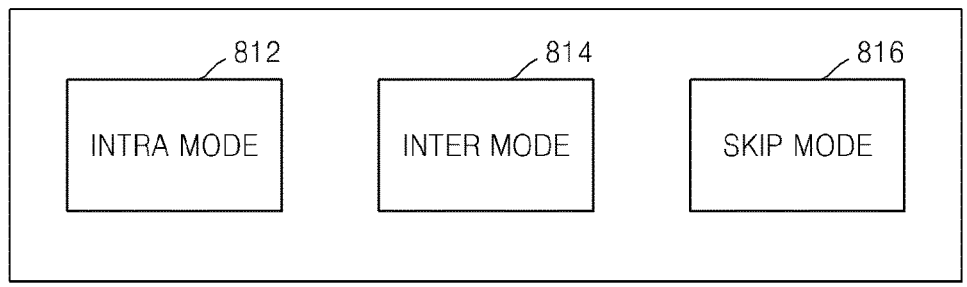
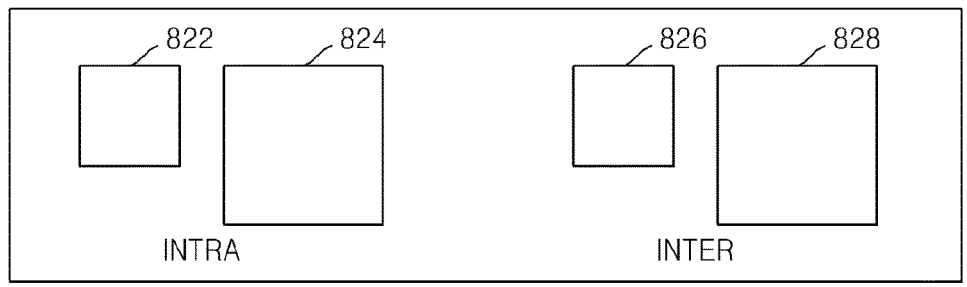

CODING UNITS (1010)

VIDEO ENCODING METHOD AND APPARATUS USING TRANSFORMATION UNIT OF VARIABLE TREE STRUCTURE, AND VIDEO DECODING METHOD AND APPARATUS

CROSS-REFERENCE TO RELATED APPLICATIONS

This application is a continuation of U.S. application Ser. No. 13/817,724 filed on Feb. 19, 2013, in the U.S. Patent and Trademark Office, now U.S. Pat. No. 9,674,553, issued on Jun. 6, 2017, which is a National Stage of International Application No. PCT/KR2011/006037, filed Aug. 17, 2011, which claims priority from U.S. Provisional Patent Application No. 61/374,348, filed on Aug. 17, 2010, the contents of which are incorporated herein by reference in their entireties.

BACKGROUND

1. Field

Exemplary embodiments relate to video encoding and decoding in which a transformation between a spatial domain and a transform domain is performed.

2. Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size. Also, in the related art video codec, video data is encoded and decoded by performing a transformation and inverse-transformation by using macroblocks having the same size.

SUMMARY

Exemplary embodiments provide a method and apparatus for encoding and decoding video by performing a transformation and inverse-transformation by using a data unit in a variable hierarchical structure.

According to an exemplary embodiment, there is provided a video encoding method, the method includes: encoding a current region of a video by including operations of performing a transformation on the current region by using transformation units in a variable tree-structure which are determined from among transformation units that are hierarchically split from a base transformation unit with respect to the current region and which are generated based on a maximum split level of a transformation unit, and determining transformation units from among the transformation units in the variable tree-structure with respect to the current region; and outputting encoded data of the current region which is generated via encoding including the transformation based on the determined transformation units, information about an encoding mode determined in the encoding with respect to the current region, and transformation-unit hierarchical-structure information including maximum size information and minimum size information of the transformation unit with respect to the video.

According to an aspect of an exemplary embodiment, there is provided a video encoding method, in order to encode a current region of a video, including operations of performing a transformation on the current region by using transformation units in a variable tree-structure which are determined from among transformation units that are hierarchically split from a base transformation unit with respect to the current region and which are generated based on a maximum split level of a transformation unit, and determining transformation units from among the transformation units in the variable tree-structure with respect to the current region; and outputting encoded data of the current region which is generated via encoding including the transformation based on the determined transformation units, information about an encoding mode determined in the encoding with respect to the current region, and transformation-unit hierarchical-structure information including maximum size information and minimum size information of the transformation unit with respect to the video.

According to another aspect of an exemplary embodiment, there is provided a video decoding method including operations of receiving a bitstream including data obtained by encoding a video; parsing the bitstream and extracting, from the bitstream, encoded data of a current region, information about an encoding mode determined in the encoding with respect to the current region, and transformation-unit hierarchical-structure information including maximum size information and minimum size information of the transformation unit with respect to the video; and performing an inverse-transformation on the current region by using transformation units in a variable tree-structure which are determined from among transformation units that are hierarchically split from a base transformation unit with respect to the current region and which are generated based on a maximum split level of the transformation unit, decoding the encoded data of the current region, and restoring the video.

The transformation-unit hierarchical-structure information may further include maximum split information indicating the maximum split level of the transformation unit.

A size of the base transformation unit with respect to the current region may be equal to or less than a maximum size of the transformation unit with respect to the video.

A transformation unit may be split once so that transformation units at a next lower level may be generated, a level of a predetermined transformation unit may indicate a total number of splits so as to generate the predetermined transformation unit by stepwise splitting the base transformation unit, and the base transformation unit with respect to the current region may be a maximum and uppermost-level transformation unit that is usable with respect to the current region.

The transformation units in the variable tree-structure that are generated based on the maximum split level of the transformation unit with respect to the current region may include the base transformation unit and transformation units according to levels that are generated by stepwise splitting the base transformation unit to the maximum split level.

A minimum size of the transformation units with respect to the current region may be determined as a larger one from among a minimum size of the transformation unit with respect to the video and a size of a transformation unit at a lowermost level which is obtained by splitting the base transformation unit to the maximum split level.

The maximum split level of the transformation unit may be equal to or less than a total number of levels from a maximum coding unit to a minimum coding unit that respectively correspond to a maximum size and a minimum size of the transformation units with respect to the video.

The size of the base transformation unit may be determined based on at least one of a prediction mode and a partition size which are used in encoding of the current region.

The maximum split level of the transformation unit with respect to the current region may be set for each of data groups at a data level from among data levels including a picture sequence, a picture, a slice, and a data unit for the encoding of the video, and the maximum split information of the transformation unit may be encoded as a parameter with respect to a data level by which the maximum split level is determined.

The maximum split level of the transformation unit with respect to the current region may be separately determined in each of prediction modes used while the encoding is performed on the current region.

The maximum split level of the transformation unit with respect to the current region may be separately determined in each of slice types used while the encoding is performed on the current region.

The size of the base transformation unit with respect to the current region may be constant.

The base transformation unit with respect to the current region may be determined as data units having shapes that are included in partitions so as not to span a boundary between the partitions that are data units for prediction encoding with respect to the current region.

Transformation units at lower levels which are obtained by splitting the base transformation unit with respect to the current region may be determined as data units having shapes that are included in the partitions so as not to span the boundary between the partitions that are the data units for prediction encoding with respect to the current region.

According to another aspect of an exemplary embodiment, there is provided a video encoding apparatus including a transformation-unit determining unit, in order to encode a current region of the video, performing a transformation on the current region by using transformation units in a variable tree-structure which are determined from among transformation units that are hierarchically split from a base transformation unit with respect to the current region and which are generated based on a maximum split level of a transformation unit, and determining transformation units from among the transformation units in the variable tree-structure with respect to the current region; and an output unit outputting encoded data of the current region which is generated via encoding including the transformation based on the determined transformation units, information about an encoding mode determined in the encoding with respect to the current region, and transformation-unit hierarchical-structure information including maximum size information and minimum size information of the transformation unit with respect to the video.

According to another aspect of an exemplary embodiment, there is provided a video decoding apparatus including a receiving unit receiving a bitstream including data obtained by encoding the video; an extracting unit parsing the bitstream and extracting, from the bitstream, encoded data of a current region, information about an encoding mode determined in the encoding with respect to the current region, and transformation-unit hierarchical-structure information including maximum size information and minimum size information of the transformation unit with respect to the video; and a decoding unit performing an inverse-transformation on the current region by using transformation units in a variable tree-structure which are determined from among transformation units that are hierarchically split from a base transformation unit with respect to the current region and which are generated based on a maximum split level of the transformation unit, decoding the encoded data of the current region, and restoring the video.

According to another aspect of an exemplary embodiment, there is provided a computer-readable recording medium having recorded thereon a program for executing the video encoding method. According to another aspect of an exemplary embodiment, there is provided a computer-readable recording medium having recorded thereon a program for executing the video decoding method.

Accordingly, in a process of encoding and decoding a video, transformation and inverse-transformation are performed by using transformation units having various sizes and shapes in a tree-structure, whereby the video may be efficiently encoded and decoded, in consideration of an image characteristic.

BRIEF DESCRIPTION OF THE DRAWINGS

FIG. 19 is a diagram for describing a relationship between a coding unit and transformation units, according to an exemplary embodiment.

FIG. 20 is a diagram for describing encoding information of coding units corresponding to a coded depth, according to an exemplary embodiment.

DETAILED DESCRIPTION OF EXEMPLARY EMBODIMENTS

Hereinafter, in one or more exemplary embodiments described below, an 'image' may collectively indicate not only a still image but also a moving picture including a video.

When various operations related to the image are performed, data related to the image may be split into data groups, and the same operation may be performed on a plurality of pieces of data included in the same data group. Hereinafter, throughout the specification, a data group that is formed according to a predetermined standard is referred to as 'data unit'. Hereinafter, throughout the specification, an operation that is performed on every 'data unit' means that the operation is performed by using a plurality of pieces of data included in the data unit.

Hereinafter, with reference to FIGS. 1 through 12, video encoding and decoding using a transformation unit in a variable tree-structure will be described. Hereinafter, with reference to FIGS. 13 through 27, video encoding and decoding using a coding unit in a tree-structure and a transformation unit in a variable tree-structure will be described.

Hereinafter, with reference to FIGS. 1 through 12, a video encoding apparatus and a video decoding apparatus, and a video encoding method and a video decoding method, which use a transformation unit in a variable tree-structure, will be described.

Figure 1:
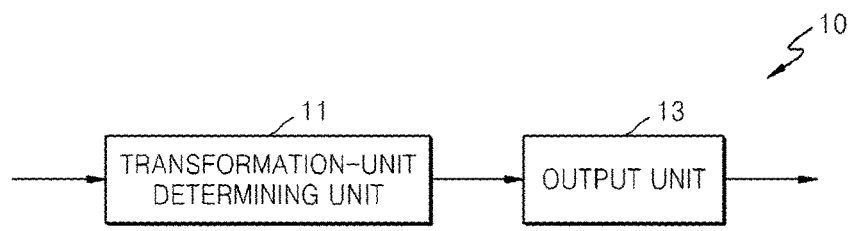
FIG. 1 is a block diagram of a video encoding apparatus using transformation unit in variable tree-structure according to an exemplary embodiment.

FIG. 1 is a block diagram of a video encoding apparatus using transformation unit in variable tree-structure 10 according to an exemplary embodiment.

The video encoding apparatus using transformation unit in variable tree-structure includes a transformation-unit determining unit 11 and an output unit 13. Hereinafter, for convenience of description, the video encoding apparatus using transformation unit in variable tree-structure 10 is referred to as 'video encoding apparatus 10'. Operations by the transformation-unit determining unit 11 and the output unit 13 of the video encoding apparatus 10 may be cooperatively controlled by a video encoding processor, a central processor, a graphic processor, or the like.

In order to encode a current picture of an input video, the video encoding apparatus 10 splits the current picture into data units having a predetermined size and then performs encoding for each of the data units.

For example, the current picture consists of pixels of a spatial domain. In order to allow adjacent pixels in a predetermined range to form a group so as to allow pixels that are spatially adjacent to each other in the current picture to be encoded together, the current picture may be split into pixel groups having a predetermined size. By a series of encoding operations that are performed on pixels of split pixel groups having the predetermined size, encoding with respect to the current picture may be performed.

Since initial data that is an encoding target of a picture is a pixel value of the spatial domain, each of the pixel groups having the predetermined size may be used as a data unit that is an encoding target. Also, transformation for video encoding is performed on pixel values of the pixel group of the spatial domain, so that transform coefficients of a transform domain are generated, and in this regard, the transform coefficients maintain a coefficient group having the same size as the pixel group of the spatial domain. Thus, the coefficient group of the transform coefficients of the transform domain may also be used as a data unit for encoding of a picture.

Thus, throughout the spatial domain and the transform domain, a data group having a predetermined size may be used as a data unit for encoding. Here, a size of the data unit may be defined as a total number of pieces of data included in the data unit. For example, a total number of the pixels of the spatial domain or a total number of the transform coefficients of the transform domain may indicate the size of the data unit.

Hereinafter, a 'current region' may indicate a data group having a data level that is one of a data unit, a slice, a picture, and a picture sequence which are encoding targets in a video.

The video encoding apparatus 10 may perform prediction encoding including inter prediction and intra prediction, transform and quantization, and entropy encoding on each of regions, thereby performing encoding on the current picture.

The transformation-unit determining unit 11 determines a transformation unit that is a data unit to perform transformation on a current region of the current picture. The transformation unit may be determined as the data unit having a size equal to or less than the current region so as to be included in the current region.

For example, the transformation-unit determining unit 11 may generate the transformation unit by halving a height and a width of the current region. Also, the transformation-unit determining unit 11 may generate the transformation unit by asymmetrically splitting at least one of the height and the width of the current region. The transformation-unit determining unit 11 may generate the transformation unit by splitting at least one of the height and the width of the current region according to an arbitrary ratio. The transformation unit may be a polygonal-shape data unit included in the current region.

The transformation-unit determining unit 11 may generate transformation units at a lower level by splitting again at least one of a height and a width of the transformation unit.

The transformation-unit determining unit 11 may determine transformation units in a tree structure for transformation of the current region. The transformation units in a tree structure include final transformation units that are determined to output a transformation result and that are determined from among transformation units in the current region.

In order to determine the transformation units in a tree structure, the transformation-unit determining unit 11 may generate transformation units at a lower level by repeatedly splitting at least one of a height and a width of a predetermined transformation unit from among the transformation units in the current region.

Also, the transformation-unit determining unit 11 may determine whether to split each of the transformation units into transformation units at a lower level, and the determination may be independently performed in each of transformation units that have the same level and that are generated by being split from an upper-level transformation unit.

In one embodiment, an operation in which a transformation unit having a predetermined level is split into transformation units at a lower level may include an operation in which at least one of the transformation units having the predetermined level is split.

For example, from an uppermost transformation unit of the current region to a predetermined level, all transformation units may be split or may not be split at every split level.

In another embodiment, when a transformation unit is split from a predetermined level to a lower level, whether to split transformation units at a certain level may be independently determined at every predetermined level, so that sizes of transformation units at a lower level may not be constant.

The transformation-unit determining unit 11 generates residual data by performing the inter prediction or the intra prediction on the current region, and performs transformation with respect to the residual data based on a transformation unit determined by the transformation-unit determining unit 11, so that the transformation-unit determining unit 11 encodes the current region. That is, the residual data for each partition for prediction of the current region is re-split by using the transformation unit determined by the transformation-unit determining unit 11, so that transformation may be performed on the residual data for each of the transformation units.

In the present embodiment, 'transformation' for video encoding indicates a data processing technique used to transform video data of a spatial domain into data of a transform domain. The transformation for video encoding, which is performed by the transformation-unit determining unit 11, may include frequency transformation, orthogonal transformation, integer transformation, and the like.

The transformation-unit determining unit 11 may repeatedly perform transformation on transformation units that are included in the current region and that are at all levels according to a hierarchical structure, by using transformation units according to the levels, may compare an error of the transformation by the transformation units according to the levels, and thus may select the transformation units at a level which causes a minimum error. The transformation unit at the level, which generates a transform coefficient that causes a minimum error, may be determined as a transformation unit with a transformation depth that is a level at which a transformation result is output.

Accordingly, the transformation-unit determining unit 11 may determine the transformation units in a tree structure including the transformation units that are determined to output the transformation result.

According to the present embodiment, a maximum size and a minimum size of a transformation unit with respect to the video may be set in advance. The transformation-unit determining unit 11 may determine a base transformation unit that is equal to or less than the maximum size of the transformation unit with respect to the video, for each of regions in the current picture. The base transformation unit is a maximum and uppermost-level transformation unit that is usable in the current region.

The transformation-unit determining unit 11 may limit a total number of levels of a transformation unit in the current region. The transformation unit is split once so that transformation units at a lower level are generated, and a level of a predetermined transformation unit may indicate a total number of splits performed until the predetermined transformation unit is generated after the base transformation unit is split according to levels. Thus, a maximum split level of the transformation unit in the current region may be related to a maximum total number of splits from the base transformation unit of the current region to a transformation unit at a lowermost level.

According to the base transformation unit and the maximum split level of the transformation unit which may be variously set with respect to the current region, a total number of levels and a hierarchical structure of the transformation unit may be changed. Accordingly, the transformation-unit determining unit 11 may use transformation units in a variable tree structure, based on the maximum split level of the transformation unit. The transformation units in the variable tree structure may include the base transformation unit, and transformation units according to levels that are generated by being stepwise split from the base transformation unit to the maximum split level of the transformation unit.

The transformation-unit determining unit 11 may perform transformation on the current region based on transformation units in a variable tree-structure which are generated based on the maximum split level of the transformation unit and which are determined from among the transformation units that are stepwise split from the base transformation unit with respect to the current region. The transformation-unit determining unit 11 may finally determine transformation units that are from among the transformation units in the variable tree-structure and that are to be used in outputting a transform coefficient of the current region.

A minimum size of the transformation units with respect to the current region may be determined as a greater one from among a minimum size of a transformation unit with respect to the video and a size of the transformation unit at the lowermost level which is obtained by splitting the base transformation unit to the maximum split level of the transformation unit.

A maximum total number of splits of a transformation unit may be equal to or less than a total number of splits from a maximum transformation unit to a minimum transformation unit which respectively correspond to a maximum size and the minimum size of the transformation units with respect to the current region. Thus, the maximum split level of the transformation unit may be equal to or less than the total number of splits from the maximum transformation unit to the minimum transformation unit which respectively correspond to the maximum size and the minimum size of the transformation units with respect to the current region.

A size of base transformation units with respect to the current region may be constant. Also, base transformation units having different sizes may be set according to characteristics of regions. For example, a size of the base transformation unit may be determined based on at least one of a prediction mode and a partition size which are used in encoding of the current region.

The maximum split level of the transformation unit may be set for each data group at a predetermined level from among data levels including a picture sequence, a picture, a slice, and an encoding data unit which are of the video. That is, for example, the maximum split level with respect to a current picture sequence may be set or the maximum split level may be set for each picture, each slice, or each data unit. In another example, the maximum split level of the transformation unit may be implicitly set in advance between encoding and decoding systems.

The maximum split level of the transformation unit with respect to the current region may be separately determined for each slice type that is used in encoding of the current region.

The base transformation unit with respect to the current region may be determined as a data unit having a shape included in partitions that are a data unit for the prediction encoding of the current region, whereby the data unit may not span a boundary between the partitions.

Also, transformation units at a lower level which are obtained by splitting the base transformation unit with respect to the current region may be determined as data units having a shape included in the partitions that are the data unit for the prediction encoding of the current region, whereby the data units may not span the boundary between the partitions.

Examples related to the decision of the base transformation unit and the transformation units at the lower level are described later with reference to FIGS. 5 through 10.

The output unit 13 may output a bitstream including encoded data of the current region, information about the encoding mode, and various types of information about a transformation unit.

The output unit 13 may output the encoded data of the current region which is generated after various encoding operations including the transformation based on the transformation unit determined by the transformation-unit determining unit 11, and quantization, inter prediction, intra prediction, entropy encoding, or the like.

The output unit 13 may output various types of information about the encoding modes related to encoding schemes used in the various encoding operations including the transformation based on the transformation unit determined by the transformation-unit determining unit 11, and quantization, inter prediction, intra prediction, entropy encoding, or the like.

The output unit 13 may output transformation-unit hierarchical-structure information indicating the hierarchical structure of transformation units with respect to the video. The transformation-unit hierarchical-structure information may include information about the maximum size and the minimum size of the transformation unit with respect to the video, and transformation index information.

In an embodiment, the transformation index information may indicate information about a structure of the transformation unit that is used in transformation of the current region. For example, the transformation index information may include a total number of splits from the current region to a transformation unit at a lowermost level, a size of the transformation unit, and a shape of the transformation unit.

In another embodiment according to a case that a transformation unit at an upper level is split into transformation units having the same size at every level, the transformation index information may indicate a total number of splits the current region to the transformation unit at the lowermost level.

The output unit 13 may output the information about the maximum size and the minimum size of the transformation unit with respect to the video. In an embodiment, the information about the maximum size and the minimum size of the transformation unit with respect to the video may be output while included in a sequence parameter set or a picture parameter set of a video stream.

The transformation-unit hierarchical-structure information may include transformation-unit maximum split information indicating the maximum split level of the transformation unit. Thus, the output unit 13 may encode and output the transformation-unit maximum split information. In an embodiment, the transformation-unit maximum split information may be output while included in the sequence parameter set or the picture parameter set, or may be set for each slice or each region having a predetermined size.

In another embodiment, when the maximum split level of the transformation unit is implicitly set in advance between the encoding and decoding systems, it is not required to encode and output the transformation-unit maximum split information.

The output unit 13 may determine transformation-unit sub-split information for each transformation unit in the variable tree-structure with respect to the current region, and then may output the transformation-unit sub-split information that indicates whether a certain transformation unit is split into transformation units at a next lower level. The output unit 13 may skip the transformation-unit sub-split information with respect to a transformation unit having a minimum size that is from among transformation units determined with respect to the current region and that is allowed with respect to the current region.

The output unit 13 may determine and output hierarchical transformation-units pattern information for each of transformation units that are determined with respect to the current region, and the hierarchical transformation-units pattern information may indicate existence of a transformation unit that includes a non-zero coefficient and that is from among transformation units at a lower level.

Figure 2:
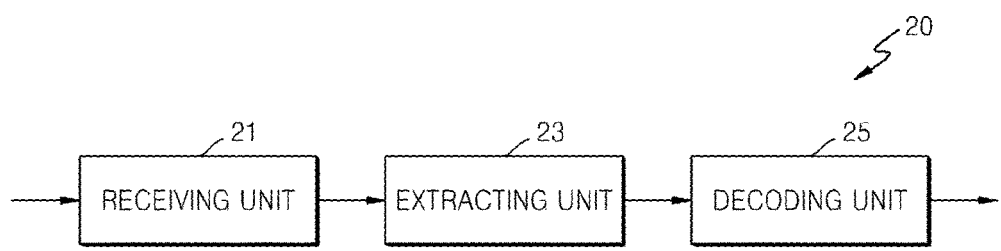
FIG. 2 is a block diagram of a video decoding apparatus using transformation unit in variable tree-structure, according to an exemplary embodiment.

FIG. 2 is a block diagram of a video decoding apparatus using transformation unit in variable tree-structure 20, according to an exemplary embodiment.

The video decoding apparatus using transformation unit in variable tree-structure 20 includes a receiving unit 21, an extracting unit 23, and a decoding unit 25. Hereinafter, for convenience of description, the video decoding apparatus using transformation unit in variable tree-structure 20 is referred to as 'video decoding apparatus 20'. Operations by the receiving unit 21, the extracting unit 23, and the decoding unit 25 of the video decoding apparatus 20 may be cooperatively controlled by a video encoding processor, a central processor, a graphic processor, or the like.

In order to restore an image from a bitstream, the video decoding apparatus 20 may perform operations including entropy decoding, inverse-quantization, inverse-transformation, inter prediction/compensation, and intra prediction/compensation, thereby decoding encoded image data of the bitstream.

The receiving unit 21 receives and parses a bitstream with respect to an encoded video. The extracting unit 23 extracts data encoded with respect to each of regions of a current picture, information about an encoding mode, and various types of information about a transformation unit from the bitstream that is parsed by the receiving unit 21.

The extracting unit 23 may deliver encoded data of a current region, the information about the encoding mode, and the various types of information about the transformation unit to the decoding unit 25.

The decoding unit 25 may perform various decoding operations including entropy decoding, inverse-quantization, inverse-transformation, inter prediction/compensation, and intra prediction/compensation on the encoded data, according to various decoding schemes that are determined based on the information about the encoding mode, may restore a pixel value of the current region, and then may restore the current picture.

The extracting unit 23 may extract transformation-unit hierarchical-structure information such as maximum size information and minimum size information of the transformation unit, maximum size information and minimum size information of the transformation unit, or the like which are related to a hierarchical structure of the transformation unit from the bitstream.

The decoding unit 25 may determine a transformation unit required for the inverse-transformation with respect to the current region, based on the various types of information about the transformation unit which are extracted by the extracting unit 23, and may perform the inverse-transformation with respect to the current region based on the transformation unit. The inverse-transformation that is performed for decoding of the video, by the decoding unit 25, may indicate a process of transforming data of a transform domain to data of a spatial domain. The inverse-transformation by the decoding unit 25 may include inverse frequency transformation, inverse orthogonal transformation, inverse integer transformation, and the like.

Concepts of a transformation unit, a base transformation unit, and a hierarchical structure of the transformation unit are the same as the aforementioned descriptions with reference to FIG. 1 and the video encoding apparatus 10. That is, in the present embodiment, the transformation unit is generated by splitting at least one of a height and a width of the current region or a transformation unit at an upper level according to an arbitrary ratio.

In particular, transformation units in a variable tree-structure may be determined based on a maximum split level of a transformation unit or a maximum total number of splits of the transformation unit with respect to the current region. That is, the transformation units in a variable tree-structure may include a base transformation unit, and transformation units at a lower level which are split from the base transformation unit to the maximum split level that is allowed in the current video.

The extracting unit 23 may extract the maximum size information and the minimum size information of the transformation unit with respect to the video, from the transformation-unit hierarchical-structure information. In an embodiment, the maximum size information and the minimum size information of the transformation unit with respect to the video may be extracted from a sequence parameter set or a picture parameter set of a video stream.

The extracting unit 23 may extract transformation-unit maximum split information from the transformation-unit hierarchical-structure information. In an embodiment, the transformation-unit maximum split information may be extracted from the sequence parameter set or the picture parameter set, or may be extracted from a slice or parameters that are set for each of regions.

In another embodiment, when the maximum split level of the transformation unit is implicitly set in advance between encoding and decoding systems, it is not required to separately extract the transformation-unit maximum split information.

The decoding unit 25 may analyze a total number of allowable levels or a total number of allowable splits from the base transformation unit to a lowermost-level transformation unit of the current region.

The decoding unit 25 may read a maximum split level of a transformation unit which is set with respect to a picture sequence of the video. Alternatively, the maximum split level of the transformation unit may be read according to various data levels such as pictures, slices, or data units.

In another embodiment, the transformation units in a variable tree-structure may be determined based on the maximum split level of the transformation unit is implicitly set in advance between the encoding and decoding systems.

The extracting unit 23 may extract the transformation index information from the transformation-unit hierarchical-structure information. The extracting unit 23 may analyze a structure of the transformation unit, which is used in the transformation of the current region, from the transformation index information.

For example, a total number of splits from the current region to the lowermost-level transformation unit, a size of the transformation unit, and a shape of the transformation unit may be extracted from the transformation index information. When a transformation unit at an upper level is split into transformation units having the same size at every level, according to the transformation index information, the total number of splits from the current region to the lowermost-level transformation unit may be read.

The extracting unit 23 may extract transformation-unit sub-split information for each of transformation units that are determined with respect to the current region. The decoding unit 25 may determine whether to split a transformation unit at a current level into transformation units at a next lower level, based on the transformation-unit sub-split information. When the transformation-unit sub-split information is no longer extracted with respect to a transformation unit at a predetermined level, the transformation unit at the predetermined level may be analyzed as a minimum-size transformation unit that is allowed with respect to the current region. The extracting unit 23 may extract hierarchical transformation-units pattern information from each of transformation units that are determined with respect to the current region. The decoding unit 25 may analyze existence of a transformation unit that includes a non-zero coefficient and that is from among transformation units at a lower level of a current transformation unit, from the hierarchical transformation-units pattern information.

In an embodiment, transformation units required for the inverse-transformation may be analyzed from transformation units in a hierarchical structure which are uniformly split into transformation units having a constant size at every level from an uppermost-level transformation unit of the current region to a predetermined split level, based on the transformation-unit hierarchical-structure information. In another embodiment, whether to split a transformation unit at an upper level into transformation units at a lower level is separately determined, transformation units at a transformation level that is determined to be required for the inverse-transformation based on the transformation-unit hierarchical-structure information are not limited to transformation units having a constant size.

Thus, the decoding unit 25 may perform the inverse-transformation on the current region by using the transformation units that are determined based on transformation-unit related information extracted by the extracting unit 23.

In particular, the decoding unit 25 may analyze the transformation units in a variable tree-structure which are allowed with respect to the current region, based on the maximum split level of the transformation unit with respect to the current region which is determined based on the transformation-unit maximum split information, and may detect transformation units that are to be used in inverse-transformation of a transform coefficient and that are determined from among the transformation units in a variable tree-structure. The decoding unit 25 may perform the inverse-transformation on the current region by using the transformation units that are detected based on the maximum split level.

The decoding unit 25 may perform decoding on each of images configuring a predetermined region of the video, based on information about a corresponding encoding mode and the transformation-unit related information, and thus may decode the video.

In a video encoding and decoding procedure, the video encoding apparatus 10 and the video decoding apparatus 20 may perform the transformation and the inverse-transformation by using tree-structure transformation units having various sizes and shapes, so that the video encoding apparatus 10 and the video decoding apparatus 20 may efficiently encode and decode a video, in consideration of an image characteristic.

Also, since the encoding and the decoding are performed by using the transformation based on the transformation unit in a variable tree-structure from among transformation units in a tree structure, an encoding and decoding procedure using transformation units at a level that is not required according to the image characteristic and an encoding characteristic may be skipped, so that a calculation amount may be reduced.

Also, the maximum total number of splits or the total number of levels of the transformation unit, which is allowed with respect to the current region, may be predicted based on the maximum split level, so that it is possible to reduce a transmission amount with respect to information including the transformation-unit sub-split information which is required in determination of the transformation units to be used in the video decoding.

Figure 3:
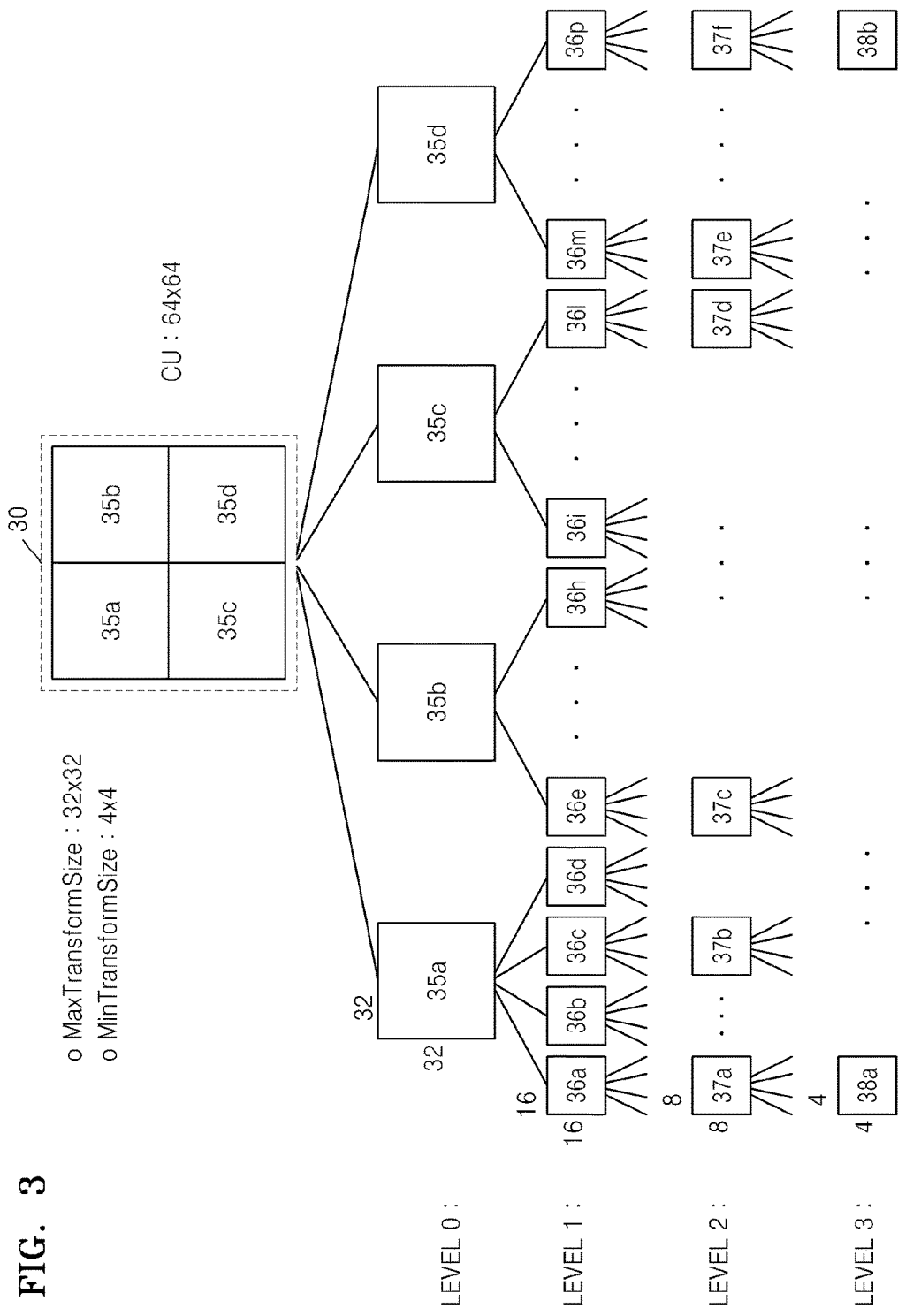
FIG. 3 illustrates a hierarchy model of a transformation unit in a tree structure, according to an exemplary embodiment.

FIG. 3 illustrates a hierarchy model of a transformation unit in a tree structure, according to an exemplary embodiment.

The transformation unit in a tree structure which is to be used in encoding of a current video, by the video encoding apparatus 10 and the video decoding apparatus 20, may be determined based on a maximum size and a minimum size of a transformation unit which are allowed in the current video.

The video encoding apparatus 10 may include maximum size information 'MaxTransformSize' and minimum size information 'MinTransformSize' of the transformation unit which is allowed in the current video in a sequence parameter set or a picture parameter set and may output them.

For example, when the maximum size information 'MaxTransformSize' and the minimum size information 'MinTransformSize' of the transformation unit indicate 32×32 and 4×4, respectively, transformation units with respect to a 64×64-size region (i.e., a coding unit (CU) 30) may include 32×32-size transformation units 35a, 35b, 35c, and 35d through 4×4-size transformation units 38a and 38b.

For convenience of description, a hierarchical relation of transformation units is assumed, in which a height and a width of a current transformation unit are halved so that four transformation units at a next lower level are generated from the current transformation unit. Since the maximum size of the transformation unit which is allowed in the current video is 32×32, a size of a transformation unit at a zero-level that is an uppermost level may be 32×32, a size of a transformation unit at a first level may be 16×16, a size of a transformation unit at a second level may be 8×8, and a size of a transformation unit at a third level may be 4×4.

In more detail, the 32×32-size transformation units 35a, 35b, 35c, and 35d at the zero-level may be split into 16×16-size transformation units 36a, 36b, 36c, 36d, 36e, 36h, 36i, 36l, 36m, and 36p at the first level. Also, the 16×16-size transformation units 36a, 36b, 36c, 36d, 36e, 36h, 36i, 36l, 36m, and 36p at the first level may be split into 8×8-size transformation units 37a, 37b, 37c, 37d, 37e, and 37f at the second level. Also, the 8×8-size transformation units 37a, 37b, 37c, 37d, 37e, and 37f at the second level may be split into the 4×4-size transformation units 38a and 38b at the third level.

Due to limitation in space, all available transformation units with respect to the transformation units 36a, 36b, 36c, 36d, 36e, 36h, 36i, 36l, 36m, and 36p at the first level, the transformation units 37a, 37b, 37c, 37d, 37e, and 37f at the second level, and the transformation units 38a and 38b at the third level are not illustrated, but, four transformation units at a next lower level may be generated from the current transformation unit.

In more detail, a total number of transformation units according to levels which may be used in transformation of a current region (i.e., the CU 30) may be 4 transformation units including the transformation units 35a, 35b, 35c, and 35d at the zero-level, 16 transformation units including the transformation units 36a, 36b, 36c, 36d, 36e, 36h, 36i, 36l, 36m, and 36p at the first level, 64 transformation units including the transformation units 37a, 37b, 37c, 37d, 37e, and 37f at the second level, and 256 transformation units including the transformation units 38a and 38b at the third level.

In order to determine transformation units in a tree structure with respect to the current region 30, the video encoding apparatus 10 may repeatedly perform transformation on the current region 30 by using the 32×32-size transformation units 35a, 35b, 35c, and 35d, the 16×16-size transformation units 36a, 36b, 36c, 36d, 36e, 36h, 36i, 36l, 36m, and 36p, the 8×8-size transformation units 37a, 37b, 37c, 37d, 37e, and 37f, and the 4×4-size transformation units 38a and 38b which are allowed in the current video.

After the video encoding apparatus 10 performs the transformation with respect to all transformation units at the zero, first, second, and third levels, the video encoding apparatus 10 may independently select a transformation unit for each of inner regions of the current region 30, wherein the transformation unit is at a level from which a transform coefficient with a minimum error is output. In an embodiment, the transformation units in a tree structure may include the transformation units at the selected level.

In order to encode information about the transformation units in a tree structure of the current region 30, the video encoding apparatus 10 may encode and output transformation depth information about transformation depths indicating levels of transformation units from which transform coefficients with the minimum error are generated.

The video decoding apparatus 20 may read the levels of the transformation units used to output the transform coefficients of the current region 30, by using the transformation depth information extracted from a bitstream, and may determine transformation units in a tree structure for inverse-transformation of the transform coefficients of the current region 30.

Figure 4:
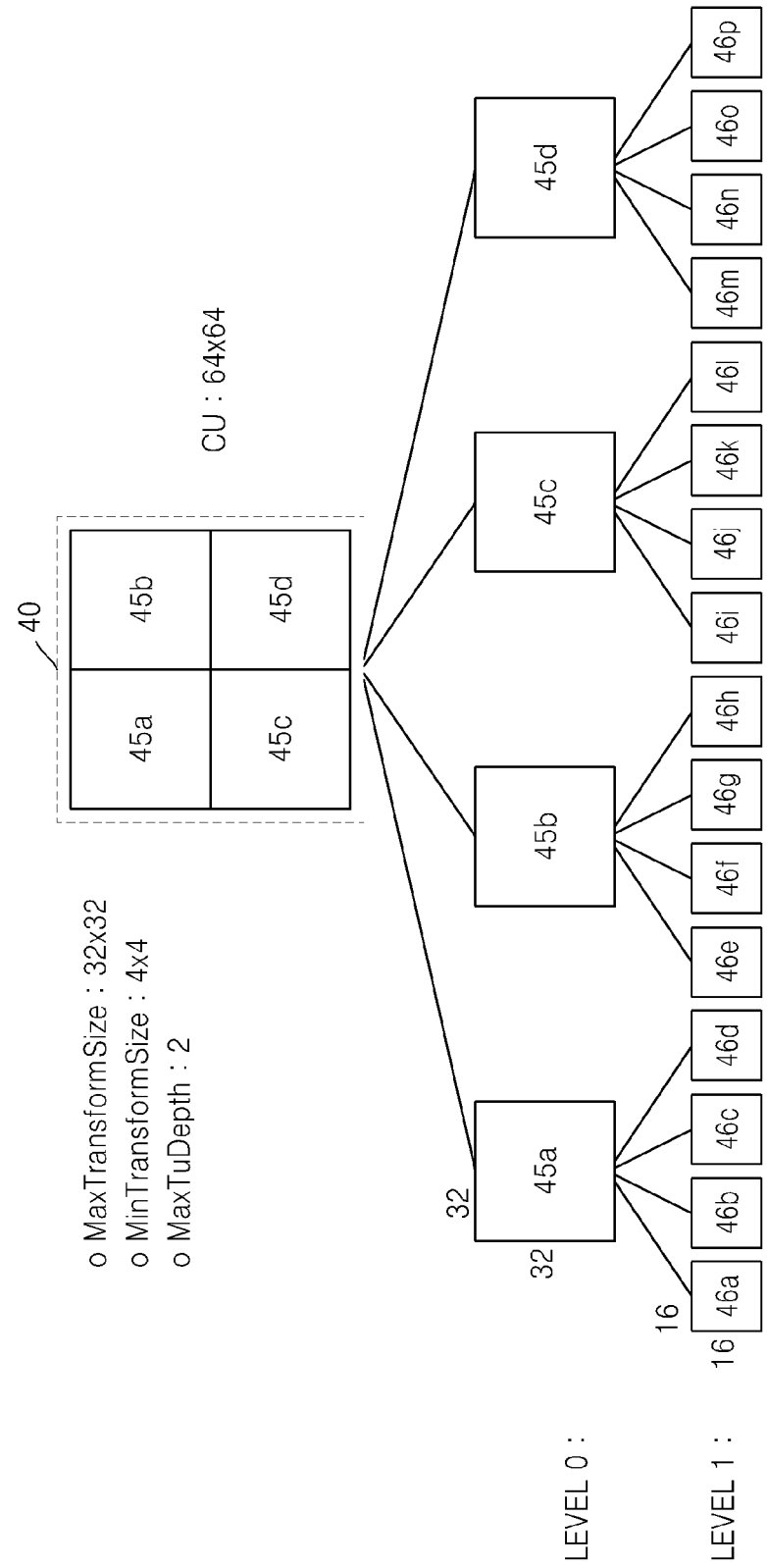
FIG. 4 illustrates a hierarchy model of a transformation unit in a variable tree-structure, according to an exemplary embodiment.

FIG. 4 illustrates a hierarchy model of a transformation unit in a variable tree-structure, according to an exemplary embodiment.

The video encoding apparatus 10 may output maximum split information 'MaxTuDepth' of a transformation unit of a current region along with maximum size information 'MaxTransformSize' and minimum size information 'MinTransformSize' of the transformation unit which is allowed in the current video.

The maximum split information of the transformation unit of the current region may indicate a maximum transformation level, i.e., a total number of allowable levels of transformation units with respect to the current region. With respect to a current region 40 of the current region, transformation units from a base transformation unit at an uppermost level to transformation units at a lowermost level that is the maximum transformation level may be allowed.

For example, the maximum transformation level with respect to the current region may be set as 2.

The base transformation unit may include 32×32-size transformation units 45*a*, 45*b*, 45*c*, and 45*d* at a zero-level.

Accordingly, transformation units with respect to the current region 40 having a size of 64×64 may include the 32×32-size transformation units 45*a*, 45*b*, 45*c*, and 45*d* at the zero-level and 16×16-size transformation units 46*a*, 46*b*, 46*c*, 46*d*, 46*e*, 46*f*, 46*g*, 46*h*, 46*i*, 46*j*, 46*k*, 46*l*, 46*m*, 46*n*, 46*o*, and 46*p* at a first level.

Based on the maximum size information 'MaxTransformSize' and the minimum size information 'MinTransformSize' of the transformation unit which is allowed in the current video, and the maximum split information 'MaxTuDepth' of the transformation unit of the current region, a minimum size of a transformation unit which may be used in the current region may be calculated by using Equation 1.

$$\text{Minimum possible leaf } TU \text{ size} = \max(\text{MinTransformSize}, \text{Root}TU\text{Size}/(2^{(\text{Max}Tu\text{Depth}-1)}))$$ [Equation 1]

That is, the minimum size 'Minimum possible leaf TU size' of the transformation unit of the current region may be a larger one from among the minimum size information 'MinTransformSize' of the transformation unit which is allowed in the current video, and a size RootTUSize/(2^(MaxTuDepth−1)) of a transformation unit at a lowermost level which is obtained by splitting the base transformation unit by a maximum total number of splits.

In Equation 1, a range of 'MaxTuDepth−1' corresponding to the maximum total number of splits satisfies Equation 2.

$$\text{Max}Tu\text{Depth}-1 \leq \log_2(\text{MaxTransformSize}) - \log_2(\text{MinTransformSize})$$ [Equation 2]

That is, the maximum total number of splits may be equal to or less than a total number of splits from a maximum transformation unit to a minimum transformation unit which are determined based on the maximum size information 'MaxTransformSize' and the minimum size information 'MinTransformSize' of the transformation unit which is allowed in the current video.

A total number of transformation units according to levels which may be used to perform transformation on the current region 40 may be four transformation units 45*a*, 45*b*, 45*c*, and 45*d* at the zero-level and 16 transformation units 46*a*, 46*b*, 46*c*, 46*d*, 46*e*, 46*h*, 46*i*, 46*l*, 46*m*, and 46*p* at the first level.

Thus, although all transformation units at the zero, first, second, and third levels may be usable according to the maximum size information and the minimum size information of the transformation unit with respect to the current video, the video encoding apparatus 10 may perform transformation on the current region 40 by using only the transformation units at the first and second levels, based on the maximum split level or the maximum total number of splits which is set with respect to the current region 40.

That is, as described above, with respect to the current region 30 of FIG. 3, the transformation is performed by using the 4 transformation units at the zero-level, the 16 transformation units at the first level, the 64 transformation units at the second level, and the 256 transformation units at the third level, based on the maximum size information and the minimum size information of the transformation unit with respect to the current video. In contrast, with respect to the current region 40 of FIG. 4, the transformation may be performed by using only 4 transformation units at the zero level and 16 transformation units at the first level, based on the maximum total number of splits or the maximum split level of the transformation unit.

Also, the video encoding apparatus 10 may encode transformation-unit sub-split information for each transformation unit which indicates whether a corresponding transformation unit is split into transformation units at a next lower level and then may output it. Since a transformation unit having a minimum size is no longer split into transformation units at a next lower level, the transformation-unit sub-split information is not required to be encoded with respect to the transformation unit at a lowermost level.

Thus, with respect to the current region 30 of FIG. 3, the transformation-unit sub-split information may be encoded with respect to the 4 transformation units at the zero-level, the 16 transformation units at the first level, and the 64 transformation units at the second level. In contrast, with respect to the current region 40 of FIG. 4, the transformation-unit sub-split information is encoded with respect to only the 4 transformation units at the zero-level, based on the maximum total number of splits or the maximum split level of the transformation unit.

Also, as described above, the maximum total number of splits of the transformation unit may be equal to or less than a total number of splits from a maximum transformation unit to a minimum transformation unit which respectively correspond to a maximum size and a minimum size which are allowed for a video, and the maximum split level of the transformation unit may be predicted according to a result thereof. In this manner, based on the predictability of the maximum split level, bits of maximum split information may be reduced.

For example, when the maximum split information is encoded according to a Truncated Unary Max Coding scheme, the total number of splits from the maximum transformation unit to the minimum transformation unit which are allowed for the video is set as a maximum value of the maximum split level, so that, when the maximum split level corresponding to the maximum value is encoded, one bit may be reduced.

As a result of comparison between the transformation units in a tree structure of FIG. 3 and the transformation units in a variable tree-structure of FIG. 4, since a total number of transformation-unit levels that are usable for the transformation is changed according to the maximum split level or the maximum total number of splits, a hierarchical structure of the transformation unit is changed. The video encoding apparatus 10 may perform transformation on each of regions of the current region 40 by using the transformation units in a variable tree-structure, and according to a result of the transformation, the video encoding apparatus 10 may independently select a transformation unit for each of the regions, wherein the transformation unit is at a level from which transform coefficients with a minimum error are output.

The video encoding apparatus 10 may encode and output transformation depth information and transformation-unit maximum split information which are required for the video encoding apparatus 10 to determine the transformation units in a variable tree-structure of the current region 40.

The video decoding apparatus 20 may read a transformation depth of the transformation units and the maximum split level of the transformation unit which are used in encoding of the current region 40, by using the transformation depth information and the transformation-unit maximum split information extracted from the bitstream. Based on the read transformation depth or level, the transformation units in a variable tree-structure which are used to inverse-transform the transform coefficients of the current region 40 may be determined.

The maximum total number of splits or the maximum split level of the transformation unit may be determined according to a characteristic of the current region. Thus, according to an image characteristic, if it is not required to perform transformation by using various types of a transformation unit, video encoding and decoding are performed by using the transformation units in a variable tree-structure, so that it is possible to reduce a calculation amount caused by performing a transformation by using transformation units with various levels and sizes. Also, since a hierarchical structure of available transformation units may be predicted based on the maximum split level of the transformation unit, bitrates for coding information related to the hierarchical structure of the transformation units may be reduced, so that a transmission efficiency of an encoding result may be improved.

With reference to FIGS. 3 and 4, the embodiments in which a height and a width of a transformation unit are halved and split into transformation units at a lower level are described. However, the transformation units in a hierarchical structure are not limited to the embodiments of FIGS. 3 and 4, and thus, in other embodiments, at least one of the height and the width of the transformation unit may be split according to an arbitrary ratio, so that the transformation units at a lower level may be generated.

FIGS. 5 through 8 illustrate base transformation units, according to various aspects of exemplary embodiments.

In an exemplary embodiment, transformation units in a variable tree-structure include transformation units at lower levels which are split from a base transformation unit, so that a shape and a size of the transformation units in the variable tree-structure may be determined according to a shape or a size of the base transformation unit.

Basically, the size of the base transformation unit is equal to or less than a maximum transformation unit with respect to a current video. Based on one of encoding modes of a region, a shape of a base transformation unit of the region may be determined.

For example, a shape of a base transformation unit of a current region may be determined according to a prediction mode from among the encoding modes of the region. For example, a size of the base transformation unit may be determined based on whether the prediction mode of the current region is an inter mode or an intra mode.

For example, the shape of the base transformation unit of the current region may be determined according to a size of a partition from among the encoding modes of the region. The partition indicates a data unit obtained by splitting the region so as to perform an inter prediction or an intra prediction on the region, and the size of the partition may indicate a shape or the size of the partition.

Figure 5:
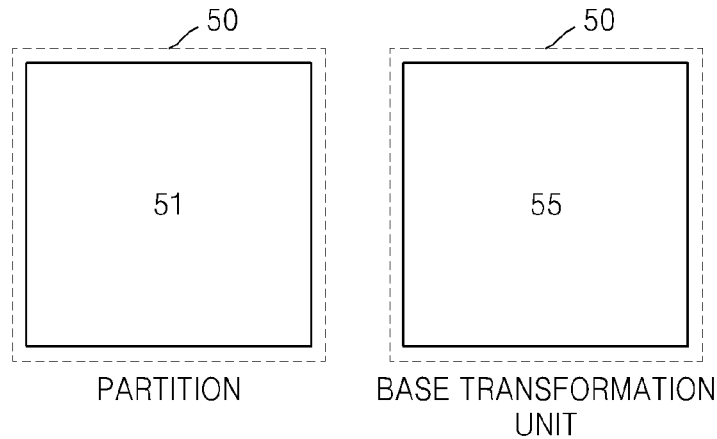
FIGS. 5 through 8 illustrate base transformation units, according to various aspects of an exemplary embodiment.

Referring to FIG. 5, a base transformation unit having the same shape as a data unit for prediction of a region may be determined. For example, a 2N x 2N-size (where N is a positive integer that is a positive power of 2) partition 51 with respect to a 2N x 2N-size region 50 is a data unit for an inter prediction or an intra prediction, and a base transformation unit of the 2N x 2N-size region 50 may be determined as a 2N x 2N-size transformation unit.

In another embodiment, a base transformation unit 55 may be determined as a transformation unit having a size equal to or less than a size of partitions of a region. In this case, since the base transformation unit is included in a partition positioned in a corresponding region, the base transformation unit may be determined not to span a boundary between partitions of a current region.

Figure 6:
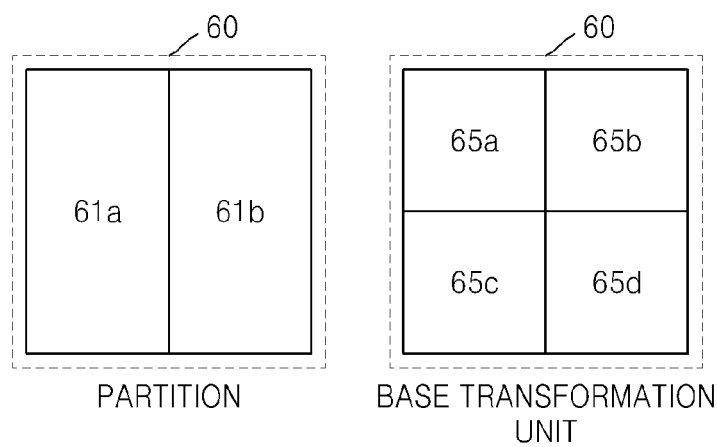

Referring to FIG. 6, when N×2N-size partitions 61a and 61b are determined with respect to a 2N×2N-size region 60, 2N×2N-size base transformation units 65a, 65b, 65c and 65d may be determined with respect to the 2N×2N-size region 60. The 2N×2N-size base transformation units 65a, 65b, 65c and 65d are less than the N×2N-size partitions 61a and 61b, so that the 2N×2N-size base transformation units 65a, 65b, 65c and 65d are included in the N×2N-size partitions 61a and 61b and do not cross a boundary between the N×2N-size partitions 61a and 61b.

Figure 7:
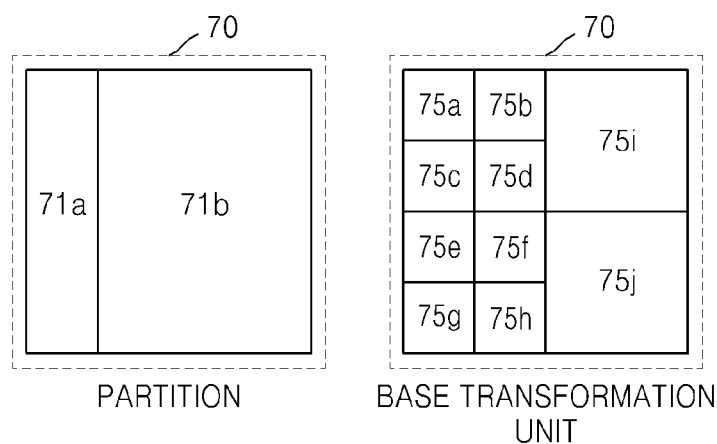

Referring to FIG. 7, partitions 71a and 71b of which widths are asymmetrically split may be determined with respect to a 4M×4M-size region 70. That is, the M×4M-size partition 71a and the 3M×4M-size partition 71b may be determined with respect to the 4M×4M-size region 70. In this case, base transformation units with respect to the 4M×4M-size region 70 may be determined as M×M-size transformation units 75a, 75b, 75c, 75d, 75e, 75f, 75g and 75h, and 2M×2M-size transformation units 75i and 75j so as not to span a boundary between the partitions 71a and 71b. The M×M-size transformation units 75a, 75b, 75c, 75d, 75e, 75f, 75g and 75h, and the 2M×2M-size transformation units 75i and 75j may be included in the partition 71a or 71b of a corresponding region.

Figure 8:
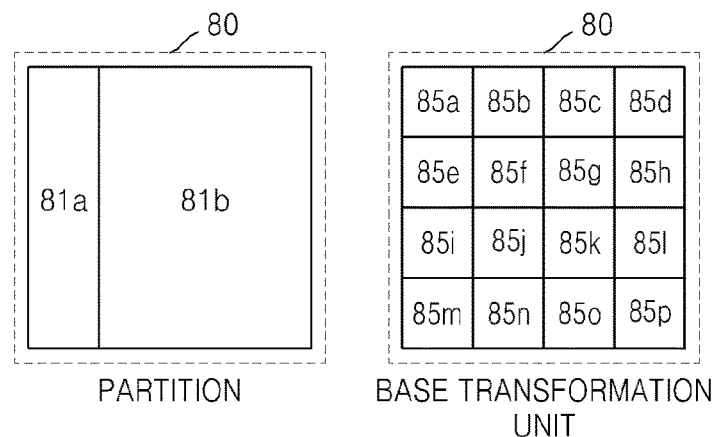

Also, it is possible to limit a size of base transformation units to be constant with respect to a current region. Referring to FIG. 8, an M×4M-size partition 81a and a 3M×4M-size partition 81b may be determined with respect to a 4M×4M-size region 80. In this case, M×M-size transformation units 85a, 85b, 85c, 85d, 85e, 85f, 85g, 85h, 85i, 85j, 85k, 85l, 85m, 85n, 85o, and 85p that do not span a boundary between the partitions 81a and 81b and that have a constant size may be determined with respect to the 4M×4M-size region 80.

In an embodiment, a maximum split level may be separately determined for each of the encoding modes of the region.

The maximum split level may be separately determined for each prediction mode of the region. For example, the maximum split level may be separately determined for each prediction mode in a manner that maximum split information 'MaxTUDepthOfInter' is determined for a region with an inter mode or maximum split information 'MaxTUDepthOfIntra' is determined for a region with an intra mode, or the like.

The maximum split level may be separately determined for each slice type. For example, the maximum split level may be separately determined for each slice type in a manner that a maximum split level value 'MaxTUDepthOfIntraSlice' is determined for an intra-type slice, a maximum split level value 'MaxTUDepthOfInterP' is determined for an inter P-type slice, a maximum split level value 'MaxTUDepthOfInterB' is determined for an inter B-type slice, or the like. In this case, a slice header may be encoded while including maximum split information for each slice type.

Figure 9:
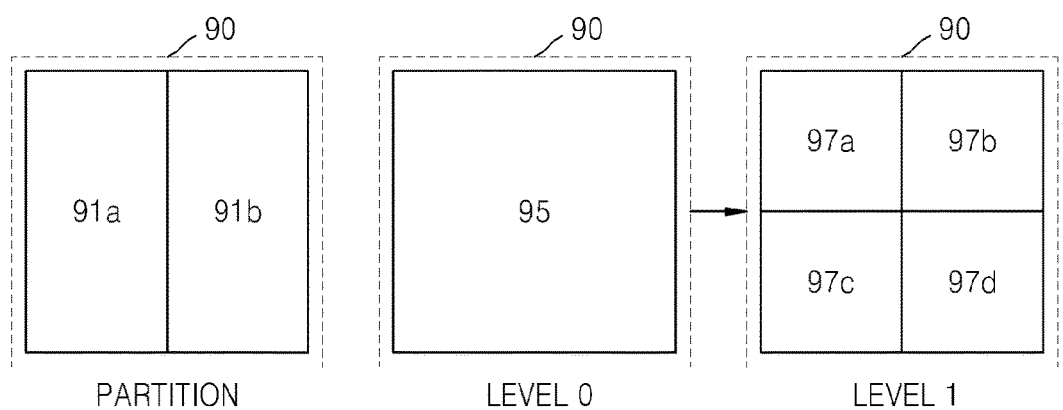
FIGS. 9 and 10 illustrate transformation units in a variable tree-structure, according to various aspects of an exemplary embodiment.
Figure 10:
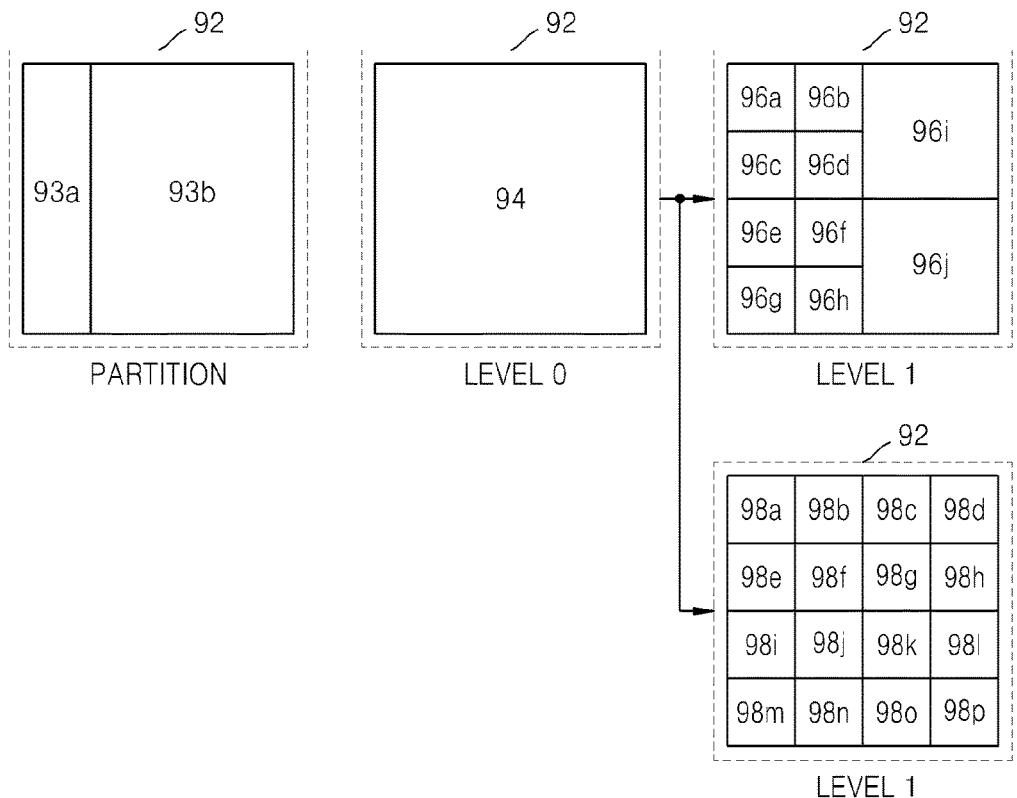

FIGS. 9 and 10 illustrate transformation units in a variable tree-structure, according to various aspects of exemplary embodiments.

The transformation units in a variable tree-structure may include a base transformation unit and transformation units that are split from the base transformation unit and that have levels lower than the base transformation unit by at least one level. For example, the base transformation unit is irrelevant to a partition size, but, the transformation units at lower levels which are split from the base transformation unit may be determined based on the partition size.

For example, referring to FIG. 9, a partition type of a 2N×2N-size region 90 may be determined as N×2N-size partitions 91a and 91b. Regardless of a size of the N×2N-size partitions 91a and 91b, a size of a base transformation unit 95 at a zero level may be determined as a 2N×2N size that is the same as the 2N×2N-size region 90. Transformation units 97a, 97b, 97c and 97d at a first level that is one-level lower from the base transformation unit 95 may be determined as N×N-size transformation units that do not span a boundary between the N×2N-size partitions 91a and 91b and that are smaller than the N×2N-size partitions 91a and 91b.

Referring to FIG. 10, a partition type of a 4M×4M-size (where M is a positive integer that is a positive power of 2) region 92 may be determined as partitions 93a and 93b that are an asymmetrical partition type. Regardless of sizes of the partitions 93a and 93b, a size of a base transformation unit 94 at a zero level may be determined as 4M×4M that is equal to the 4M×4M-size region 92.

In an embodiment, transformation units at a first level that is one-level lower from the base transformation unit 94 at the zero level may be determined as M×M-size transformation units 96a, 96b, 96c, 96d, 96e, 96f, 96g, and 96h, and 2M×2M-size transformation units 96i and 96j so as not to span a boundary between the partitions 93a and 93b.

In another embodiment, the transformation units at the first level that is one-level lower from the base transformation unit 94 at the zero level may be determined as M×M-size transformation units 98a, 98b, 98c, 98d, 98e, 98f, 98g, 98h, 98i, 98j, 98k, 98l, 98m, 98n, 98o, and 98p so as to have a constant size while they do not cross the boundary between the partitions 93a and 93b.

With reference to FIGS. 5 through 8, the base transformation units according to various aspects of exemplary embodiments are described above, and with reference to FIGS. 9 and 10, the transformation units in a variable tree-structure according to various aspects of exemplary embodiments. While the aforementioned transformation units are square-shaped data units obtained by halving a height and a width of a transformation unit at an upper level, a shape of the transformation units is not limited to the square-shaped data unit.

Figure 11:
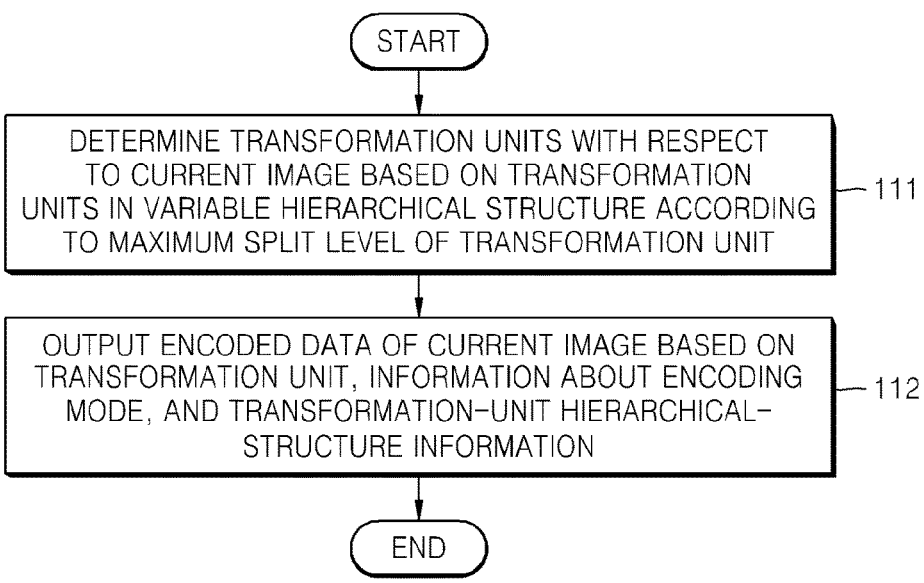
FIG. 11 is a flowchart of a video encoding method using transformation units in a variable tree-structure, according to an exemplary embodiment.

FIG. 11 is a flowchart of a video encoding method using transformation units in a variable tree-structure, according to an exemplary embodiment.

In operation 111, a video is divided into a plurality of regions and then each of the regions is encoded. In order to encode a current region having a predetermined size in the video, transformation may be performed on the current region based on transformation units in a variable tree-structure which are generated based on a maximum split level of a transformation unit from among transformation units that are hierarchically split from a base transformation unit of the current region. The current region may be a data unit, a macroblock, a picture, a slice, or the like which are for an encoding operation.

The base transformation unit of the current region unit may be a maximum-size and uppermost-level transformation unit that is usable with respect to the current region. A size of the base transformation unit may be equal to or less than a maximum size of a transformation unit with respect to the video.

The maximum split level of the transformation unit may indicate a total number of levels of the transformation unit that is allowed with respect to the current region and may correspond to a total number of splits from the base transformation unit of the current region to a transformation unit at a lowermost level which is allowed with respect to the current region.

The transformation units in a variable tree-structure may include the base transformation unit according to the maximum split level of the transformation unit, and transformation units according to levels that are generated by being stepwise split from the base transformation unit to the maximum split level of the transformation unit.

The maximum split level of the transformation unit may be separately determined for each of encoding modes including a prediction mode, a slice type, and the like which are used in encoding of the current region.

The base transformation unit with respect to the current region may be variously set according to an image characteristic.

Based on the base transformation unit that may be variously set or the maximum split level that may be variously set, the transformation units in a variable tree-structure may be used in transformation with respect to the current region. Transformation units that cause a minimum error and that are according to a result of an operation in which the transformation is performed on the current region by using the transformation units in a variable tree-structure may be determined as transformation units with a transformation depth with respect to the current region, so that a transform coefficient may be output.

In operation 112, encoded data of the current region and information about an encoding mode that is determined in encoding of the current region are output in the form of a bitstream, wherein the encoded data is generated via the encoding that includes the transformation based on the transformation unit determined in operation 111. Also, maximum size information and minimum size information of the transformation unit with respect to the video, and transformation-unit maximum split information indicating the maximum split level of the transformation unit are output while included in the bitstream.

For each of transformation units that are from among transformation units determined as a final transformation unit with respect to the current region and that exclude a transformation unit having a minimum size of the current region, transformation-unit sub-split information indicating whether each of the transformation units is split into transformation units at a next lower level may be encoded and may be output.

Also, for each of the transformation units, hierarchical transformation-units pattern information indicating existence of a transformation unit that includes a non-zero coefficient and that is from among transformation units at a lower level may be encoded and may be output.

Figure 12:
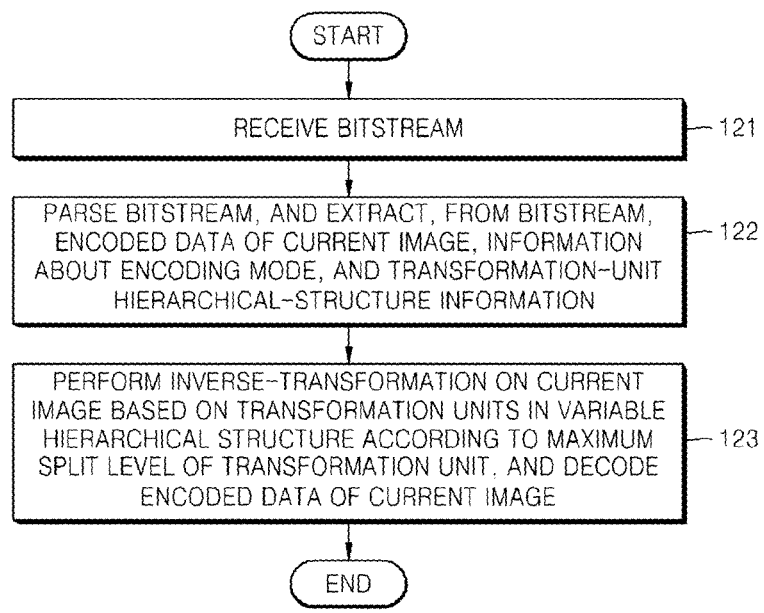
FIG. 12 is a flowchart of a video decoding method using transformation units in a variable tree-structure, according to an exemplary embodiment.

FIG. 12 is a flowchart of a video decoding method using transformation units in a variable tree-structure, according to an exemplary embodiment.

In operation 121, a bitstream including encoded data of a video is received.

In operation 122, the bitstream received in operation 121 is parsed, so that encoded data of a current region and information about an encoding mode that is determined in encoding of the current region are extracted from the bitstream.

Also, maximum size information and minimum size information of a transformation unit with respect to the video, and transformation-unit maximum split information are extracted from the bitstream. The transformation-unit maximum split information about a transformation unit with respect to the current region may be separately read for each prediction mode or each slice type which is used in encoding of the current region.

Transformation-unit sub-split information or hierarchical transformation-units pattern information may be extracted from the bitstream.

In operation 123, the encoding mode of the current region may be read from the extracted information about the encoding mode, and the encoded data of the current region may be decoded based on the encoding mode.

In particular, a maximum split level of the transformation unit with respect to the current region may be read based on the transformation-unit maximum split information. The transformation units in a variable tree-structure may be determined based on the maximum split level, wherein the transformation units in a variable tree-structure are generated based on the maximum split level of the transformation unit and are determined from among transformation units that are hierarchically split from a base transformation unit with respect to the current region. A transformation unit with a transformation depth may be determined from among the transformation units in a variable tree-structure, and inverse-transformation may be performed on a transform coefficient of the current region by using the transformation unit with the transformation depth. Afterward, the video may be restored by combining encoded results with respect to images.

A maximum total number of splits or the maximum split level of the transformation unit may be separately determined according to a spatial-domain characteristic of an image. The maximum total number of splits or the maximum split level of the transformation unit may be determined based on a capability or a data communication environment of an encoding system or a decoding system. Since the maximum total number of splits or the maximum split level is selectively limited from the base transformation unit, an encoding calculation amount and a transmission bit amount may be reduced.

Hereinafter, with reference to FIGS. 13 through 27, a video encoding apparatus and a video decoding apparatus, and a video encoding method and a video decoding method, which use a transformation unit in a tree structure and a transformation unit in a variable tree-structure, will be described.

Figure 13:
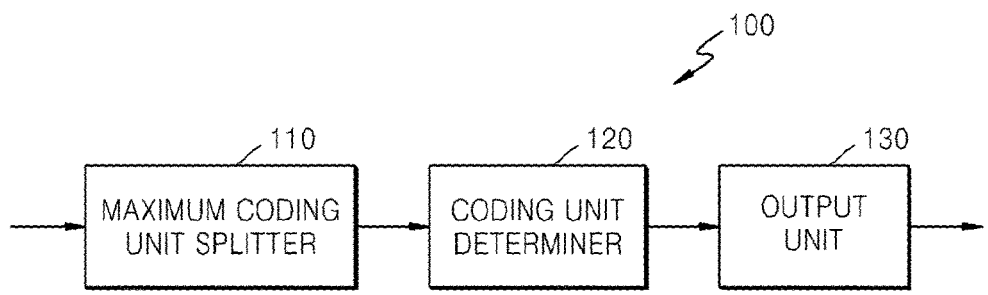
FIG. 13 is a block diagram of a video encoding apparatus using transformation unit in tree structure and transformation unit in variable tree-structure, according to an exemplary embodiment.

FIG. 13 is a block diagram of a video encoding apparatus using transformation unit in tree structure and transformation unit in variable tree-structure 100, according to an exemplary embodiment.

The video encoding apparatus using transformation unit in tree structure and transformation unit in variable tree-structure 100 includes a maximum coding unit splitter 110, a coding unit determiner 120, and an output unit 130. Hereinafter, for convenience of description, the video encoding apparatus using transformation unit in variable tree-structure and transformation unit in variable tree-structure 100 is referred to as 'video encoding apparatus 100'.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit may be a data unit having a size of 32×32, 64×64, 128×128, 256×256, etc., wherein a shape of the data unit is a square having a width and height in powers of 2. The image data may be output to the coding unit determiner 120 according to the at least one maximum coding unit.

A coding unit may be characterized by a maximum size and a depth. The depth denotes a number of times the coding unit is spatially split from the maximum coding unit. Accordingly, as the depth increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into one or more maximum coding units according to a maximum size of the coding unit, and each of the maximum coding units may include deeper coding units that are split according to depths. Since the maximum coding unit is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. The coding unit determiner 120 encodes at least one split region obtained by splitting a region of the maximum coding unit according to depths, and determines a depth to output a finally encoded image data according to the at least one split region. For example, the coding unit determiner 120 determines a coded depth by encoding the image data in the deeper coding units according to depths, according to the maximum coding unit of the current picture, and selecting a depth having the least encoding errors. For example, the coding unit determiner 120 determines a coded depth by encoding the image data in the deeper coding units according to depths, according to the maximum coding unit of the current picture, and selecting a depth having the least encoding errors. Thus, the encoded image data of the coding unit corresponding to the determined coded depth is output by the coding unit determiner 120. Thus, the encoded image data of the coding unit corresponding to the determined coded depth is output by the coding unit determiner 120. Also, the coding units corresponding to the coded depth may be regarded as encoded coding units. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding errors may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split to regions according to the depths and the encoding errors may differ according to regions in the one maximum coding unit. Thus, the coded depths may differ according to regions in the image data. Therefore, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The coding units having a tree structure include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth is an index related to a number of splitting times from a maximum coding unit to a minimum coding unit. A first maximum depth may denote a total number of splitting times from the maximum coding unit to the minimum coding unit. A second maximum depth may denote a total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist. In this case, the first maximum depth may be set to 4, and the second maximum depth may be set to 5.

Prediction encoding and transformation may be performed according to the maximum coding unit. The prediction encoding and the transformation may also be performed based on the deeper coding units according to a depth equal to, or depths less than, the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation may be performed on all of the deeper coding units generated as the depth increases. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform the prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for the prediction encoding will now be referred to as a prediction unit. A partition obtained by splitting the prediction unit may include a prediction unit or a data unit obtained by splitting at least one of a height and a width of the prediction unit.

For example, when a coding unit of a size of 2N×2N (where N is a positive integer that is a positive power of 2) is no longer split and becomes a prediction unit of 2N x 2N, a size of a partition may be 2N x 2N, 2N x N, N x 2N, or N x N. Examples of a partition type include symmetrical partitions that are obtained by symmetrically splitting a height or a width of the prediction unit, partitions obtained by asymmetrically splitting the height or the width of the prediction unit (such as 1:n or n:1), partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on prediction units in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

As described above with reference to FIGS. 1 through 12, in order to perform the transformation in the coding unit, the transformation may be performed based on a data unit having a size equal to or less than the transformation unit. For example, the transformation unit for the transformation may include a transformation unit for an intra mode and a transformation unit for an inter mode.

Similar to the transformation units in a tree structure according to the previous embodiments, the transformation unit in the coding unit may be recursively split into smaller sized transformation units, so that residual data in the coding unit may be divided according to the transformation units in the tree structure according to transformation depths.

A transformation depth indicating a number of splitting times to reach the transformation unit by splitting a height and a width of the coding unit may also be set for the transformation unit. For example, in a current coding unit of 2N×2N, a transformation depth may be 0 when a size of a transformation unit is 2N×2N, the transformation depth may be 1 when the size of the transformation unit is N×N, and the transformation depth may be 2 when the size of the transformation unit is N/2×N/2. In other words, the transformation unit in the tree structure may be set for the transformation unit according to a transformation depth.

Encoding information according to coding units corresponding to a coded depth uses not only information about the coded depth, but also information about information related to prediction encoding and transformation. Accordingly, the coding unit determiner 120 may determine a coded depth having a minimum encoding error and may also determine a partition type in a prediction unit, a prediction mode according to prediction units, and a size of a transformation unit for transformation.

Also, the coding unit determiner 120 may perform the transformation by using the transformation units in a variable tree-structure in a coding process with respect to the coding unit, based on a maximum split level of the transformation unit which is limitedly set in advance for each of a maximum coding unit or the current coding unit.

The transformation unit in the variable tree-structure based on the maximum split level of the transformation unit corresponds to the aforementioned description with reference to FIGS. 1 through 12. That is, the transformation unit in the variable tree-structure may include a base transformation unit, and transformation units at lower levels which are split from the base transformation unit to the maximum split level that is allowed for the coding unit.

The base transformation unit and the maximum split level may be variously set according to encoding modes. For example, a shape of a base transformation unit of a current image may be determined according to a size of a partition or a prediction mode from among the encoding modes of the coding unit.

The partition may indicate a data unit obtained by splitting a prediction unit of the coding unit, and the prediction unit may be a partition having the same size as the coding unit. In an embodiment, the base transformation unit may be determined to have the same shape as the prediction unit of the coding unit. In another embodiment, the base transformation unit may be determined to have a size equal to or less than a size of partitions so as not to span a boundary between the partitions.

Also, while the base transformation unit is larger than the partition, transformation units at lower levels than the base transformation unit may be determined to have a size less than the size of the partitions so as not to span the boundary between the partitions.

The coding unit determiner 120 may perform the transformation on each of the coding units by using the transformation units in the variable tree-structure and thus may determine the transformation units in the tree structure.

Coding units according to a tree structure in a maximum coding unit and a method of determining a partition and a transformation unit in a tree structure, according to one or more embodiments, will be described in detail later with reference to FIGS. 15 through 25.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image. The information about the encoding mode according to coded depth may include at least one of information about the coded depth, information about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth. Thus, the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth. Thus, the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths. Thus, information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit may be a rectangular data unit obtained by splitting the minimum coding unit having the lowermost depth by 4. Alternatively, the minimum unit may be a maximum-size rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include at least one of information about the prediction mode and information about a size of the partitions. The encoding information according to the prediction units may include at least one of information about an estimated direction of an inter mode, information about a reference image index of the inter mode, information about a motion vector, information about a chroma component of an intra mode, and information about an interpolation method of the intra mode.

Information about a maximum size of the coding unit defined according to pictures, slices, or groups of pictures (GOPs), and information about a maximum depth may be inserted into a header of a bitstream, a Sequence Parameter Set (SPS) or a picture parameter set.

Also, maximum size information of the transformation unit and minimum size information of the transformation unit which are allowed for the current video may be output via the header of the bitstream, the SPS or the picture parameter set. The output unit 130 may output the transformation-unit maximum split information, the transformation index information, the transformation-unit sub-split information, the hierarchical transformation-units pattern information, and the like which are described above with reference to FIGS. 1 through 12.

In the video encoding apparatus 100, the deeper coding unit may be a coding unit obtained by dividing at least one of a height and a width of a coding unit of an upper depth, which is one level above, by two. In other words, when the size of the coding unit of the current depth is 2N×2N, the size of the coding unit of the lower depth may be N×N. Also, the coding unit of the current depth having the size of 2N×2N may include 4 of the coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth both determined considering characteristics of the current picture. Also, since encoding may be performed on each maximum coding unit by using any of various prediction modes and transformations, an optimum encoding mode may be determined considering characteristics of the coding unit of various image sizes.

Thus, if an image having a high resolution or a large amount of data is encoded in units of macroblocks having a predetermined fixed size, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video encoding apparatus 100 of FIG. 13 may correspond to the video encoding apparatus 10 described above with reference to FIG. 1.

That is, in the video encoding apparatus 10, a current region may indicate a current coding unit that is one of coding units obtained by splitting a current picture of a video so as to encode the video.

The transformation-unit determining unit 11 of the video encoding apparatus 10 may split the current picture into maximum coding units, may perform transformation on each of the maximum coding units based on coding units according to depths, may select coding units with a coded depth from which a coding result that generates a minimum error is output, and then may determine coding units in a tree structure.

When the transformation-unit determining unit 11 of the video encoding apparatus 10 performs the transformation based on the coding unit, the transformation-unit determining unit 11 may perform the transformation based on a transformation unit. In particular, transformation units in a variable tree-structure may be configured based on a maximum split level of the transformation unit which is set the maximum coding unit or each of current coding units.

The transformation-unit determining unit 11 of the video encoding apparatus 10 may perform the transformation on each of the coding units, based on the transformation unit in the variable tree-structure, and thus may determine a transformation depth that is a level of a transformation unit, and a coded depth of a coding unit, which cause an optimal encoding result. Accordingly, the transformation-unit determining unit 11 may determine coding units in a tree structure and transformation units in a variable tree-structure with respect to each of the maximum coding units.

The output unit 13 of the video encoding apparatus 10 may output coded data of a picture that is coded according to the coding units in the tree structure with respect to each of the maximum coding units, may encode information about coded depths and encoding modes of the coding units in the tree structure, may encode transformation-unit maximum split information, and may output them.

Figure 14:
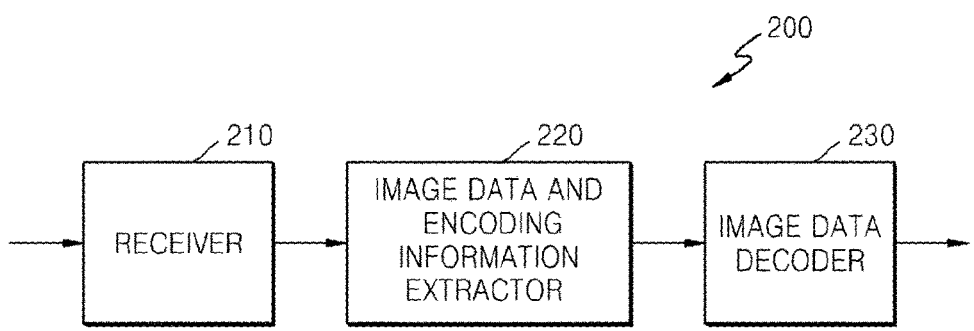
FIG. 14 is a block diagram of a video decoding apparatus using transformation unit in tree-structure and transformation unit in variable tree-structure, according to an exemplary embodiment.

FIG. 14 is a block diagram of a video decoding apparatus using transformation unit in tree-structure and transformation unit in variable tree-structure 200, according to an exemplary embodiment.

The video decoding apparatus using transformation unit in tree-structure and transformation unit in variable tree-structure 200 includes a receiver 210, an image data and encoding information extractor 220, and an image data decoder 230. Hereinafter, for convenience of description, the video decoding apparatus using transformation unit in tree-structure and transformation unit in variable tree-structure 200 is referred to as 'video decoding apparatus 200'.

Definitions of various terms, such as a coding unit, a depth, a prediction unit, a transformation unit, and information about various encoding modes, for various operations of the video decoding apparatus 200 are the same or similar to those described above with reference to FIG. 13 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture from a header corresponding to the current picture, an SPS, or a picture parameter set.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. Thus, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth. Furthermore, the information about the encoding mode may include at least one of information about a partition type of a corresponding coding unit corresponding to the coded depth, information about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Also, the image data and encoding information extractor 220 may extract maximum size information of a transformation unit and minimum size information of a transformation unit which are allowed for the current video from the header of the bitstream, the SPS or the picture parameter set. The image data and encoding information extractor 220 may extract the transformation-unit maximum split information, the transformation index information, the transformation-unit sub-split information, the hierarchical transformation-units pattern information, and the like, which are related to the transformation unit described above with reference to FIGS. 1 through 12, as encoding information.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include at least one of a prediction including intra prediction and motion compensation, and an inverse-transformation. Inverse-transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, in order to perform inverse-transformation according to the maximum coding units, the image data decoder 230 may read transformation units in a tree structure including size information about transformation units of the coding units according to coded depths, and then may perform the inverse-transformation on each of the coding units, based on the transformation unit.

The image data decoder 230 may determine the transformation units in the variable tree-structure including allowable lower levels from a base transformation unit, based on a maximum split level of a transformation unit with respect to each of the coding units. The image data decoder 230 may determine transformation units with a transformation depth which are required to perform inverse-transformation on transform coefficient, wherein the transformation units are determined from among the transformation units in the variable tree-structure, may perform the inverse-transformation on the transform coefficient, and thus may restore a pixel value.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units including the encoding information including the same split information may be gathered by observing the encoding information set assigned for the predetermined data unit from among the coding unit, the prediction unit, and the minimum unit. Moreover, the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, a maximum size of the coding unit may be determined considering resolution and an amount of image data.

Accordingly, even if image data has a high resolution and a large amount of data, the image data may be efficiently decoded and restored by using a size of a coding unit and an encoding mode, which are adaptively determined according to characteristics of the image data, by using information about an optimum encoding mode received from an encoder.

The video decoding apparatus 200 of FIG. 14 may correspond to the video decoding apparatus 20 described above with reference to FIG. 2.

That is, in the video decoding apparatus 20, a current region may indicate a current coding unit that is one of coding units obtained by splitting a current picture of a video so as to encode the video.

The extracting unit 23 of the video decoding apparatus 20 may extract, from a parsed bitstream, coded data of a picture that is coded according to the coding units in the tree structure which are included in each of the maximum coding units, and may extract information about coded depths and encoding modes for each of the coding units. Also, the extracting unit 23 of the video decoding apparatus 20 may extract transformation-unit maximum split information that is set for each picture, each slice, each maximum coding unit, or each coding unit.

The decoding unit 25 of the video decoding apparatus 20 may perform the inverse-transformation on each of the maximum coding units by using the transformation units in the tree structure. In particular, the decoding unit 25 may perform the inverse-transformation by using transformation units that are determined from among the transformation units in the variable tree-structure which are configured based on the transformation-unit maximum split information, may decode the encoded data in each of the coding units, and thus may restore a picture.

Figure 15:
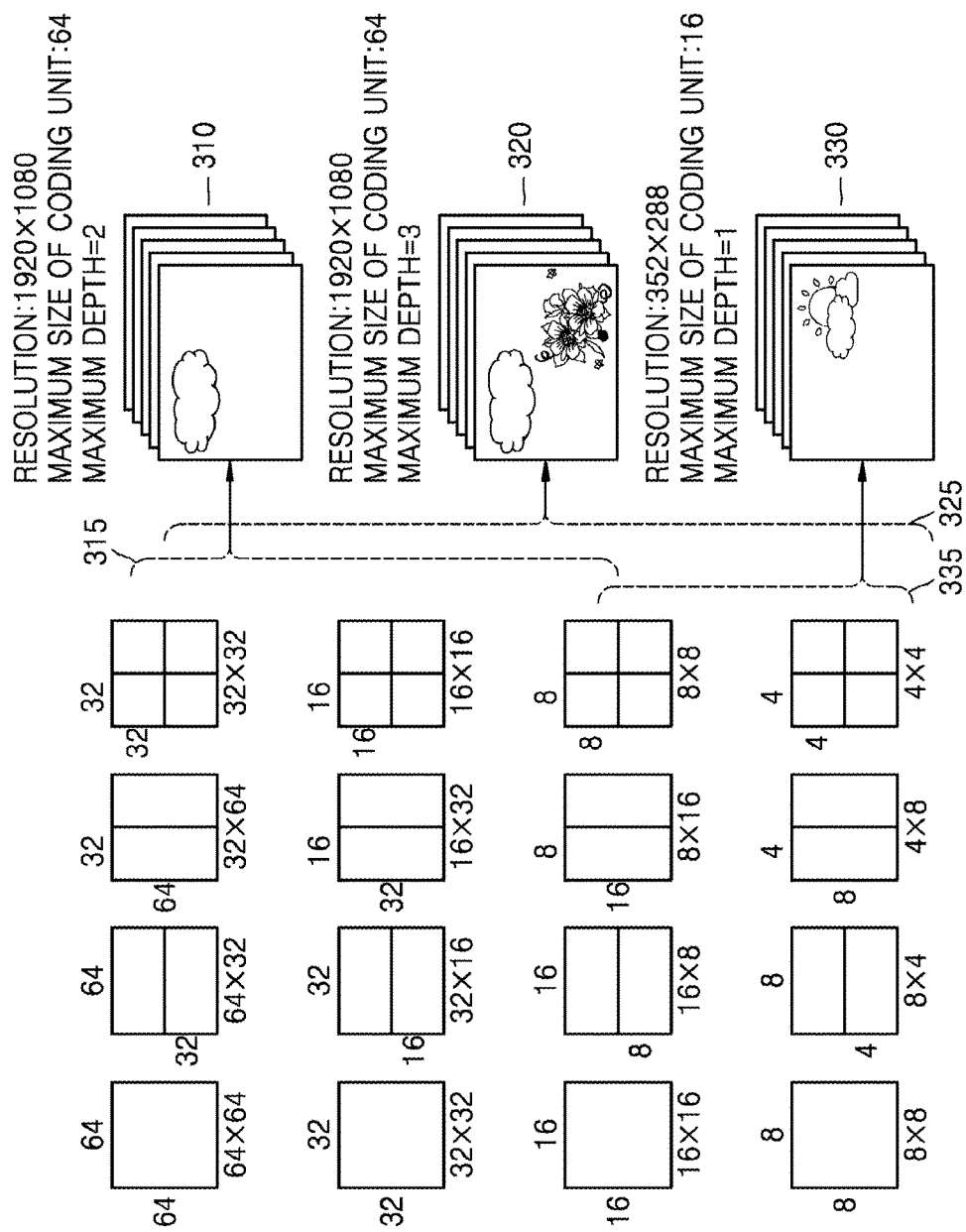
FIG. 15 is a diagram for describing a concept of coding units according to an exemplary embodiment.

FIG. 15 is a diagram for describing a concept of coding units according to an exemplary embodiment.

A size of a coding unit may be expressed in width×height, and may be 64×64, 32×32, 16×16, and 8×8, though it is understood that another embodiment is not limited thereto. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

Referring to FIG. 15, first video data 310 has a resolution of 1920×1080, a maximum size of a coding unit of 64, and a maximum depth of 2. Second video data 320 has a resolution of 1920×1080, a maximum size of a coding unit of 64, and a maximum depth of 3. Third video data 330 has a resolution of 352×288, a maximum size of a coding unit of 16, and a maximum depth of 1. The maximum depth shown in FIG. 15 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding units of the first and second video data 310 and 320 having a higher resolution than the third video data 330 may be 64.

Since the maximum depth of the first video data 310 is 2, coding units 315 of the first video data 310 may include a maximum coding unit having a long axis size of 64, and coding units having long axis sizes of 32 and 16 since depths are deepened to two levels by splitting the maximum coding unit twice. Meanwhile, since the maximum depth of the third video data 330 is 1, coding units 335 of the third video data 330 may include a maximum coding unit having a long axis size of 16, and coding units having a long axis size of 8 since depths are deepened to one level by splitting the maximum coding unit once.

Since the maximum depth of the second video data 320 is 3, coding units 325 of the second video data 320 may include a maximum coding unit having a long axis size of 64, and coding units having long axis sizes of 32, 16, and 8 since the depths are deepened to 3 levels by splitting the maximum coding unit three times. As a depth deepens (i.e., increases), detailed information may be precisely expressed.

Figure 16:
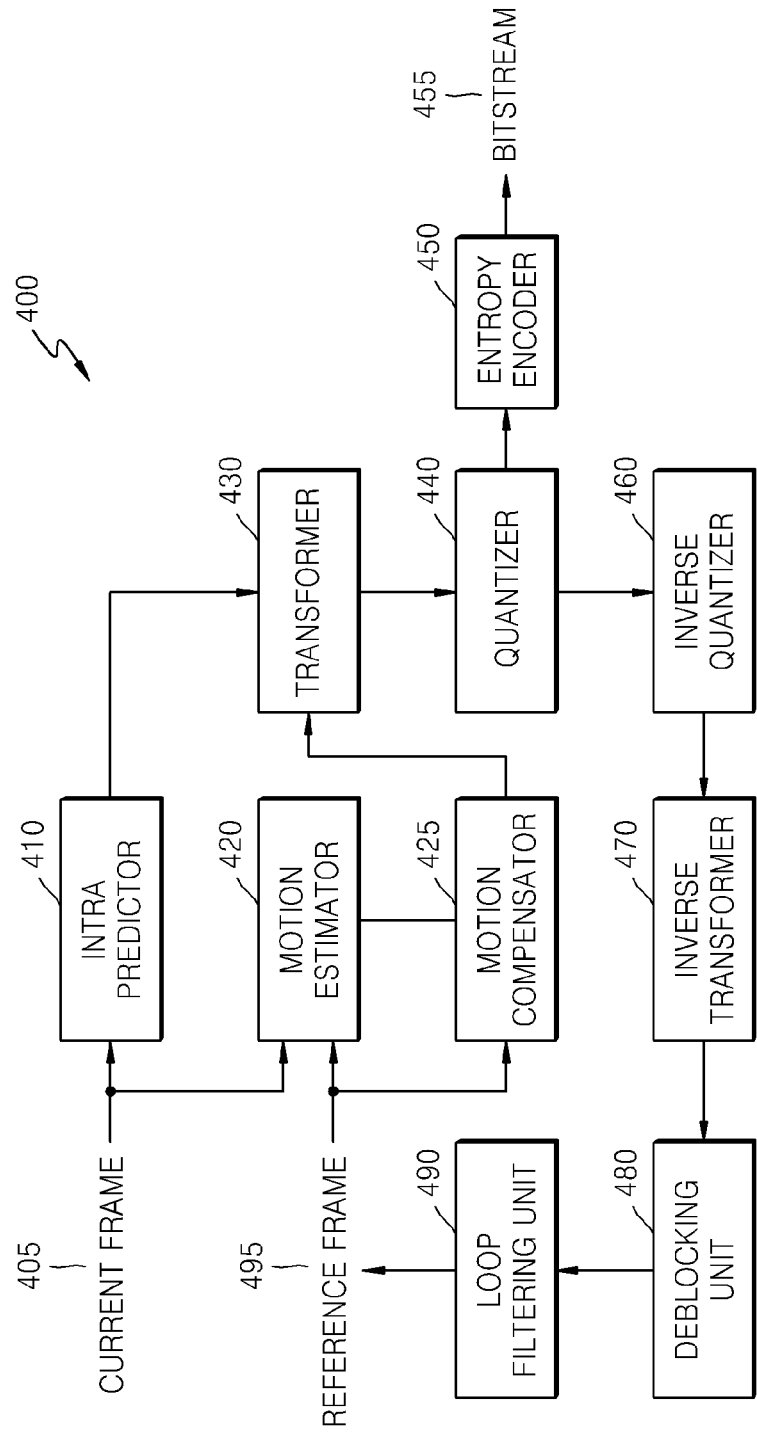
FIG. 16 is a block diagram of an image encoder based on coding units, according to an exemplary embodiment.

FIG. 16 is a block diagram of an image encoder 400 based on coding units, according to an exemplary embodiment.

Referring to FIG. 16, the image encoder 400 performs operations of the coding unit determiner 120 of the video encoding apparatus 100 to encode image data. For example, an intra predictor 410 performs intra prediction on coding units in an intra mode, from among a current frame 405, and a motion estimator 420 and a motion compensator 425 perform inter estimation and motion compensation, respectively, on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470. The restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering a maximum size and a maximum depth of a current maximum coding unit, and the transformer 430 determines a size of the transformation unit in each coding unit from among the coding units having a tree structure.

Figure 17:
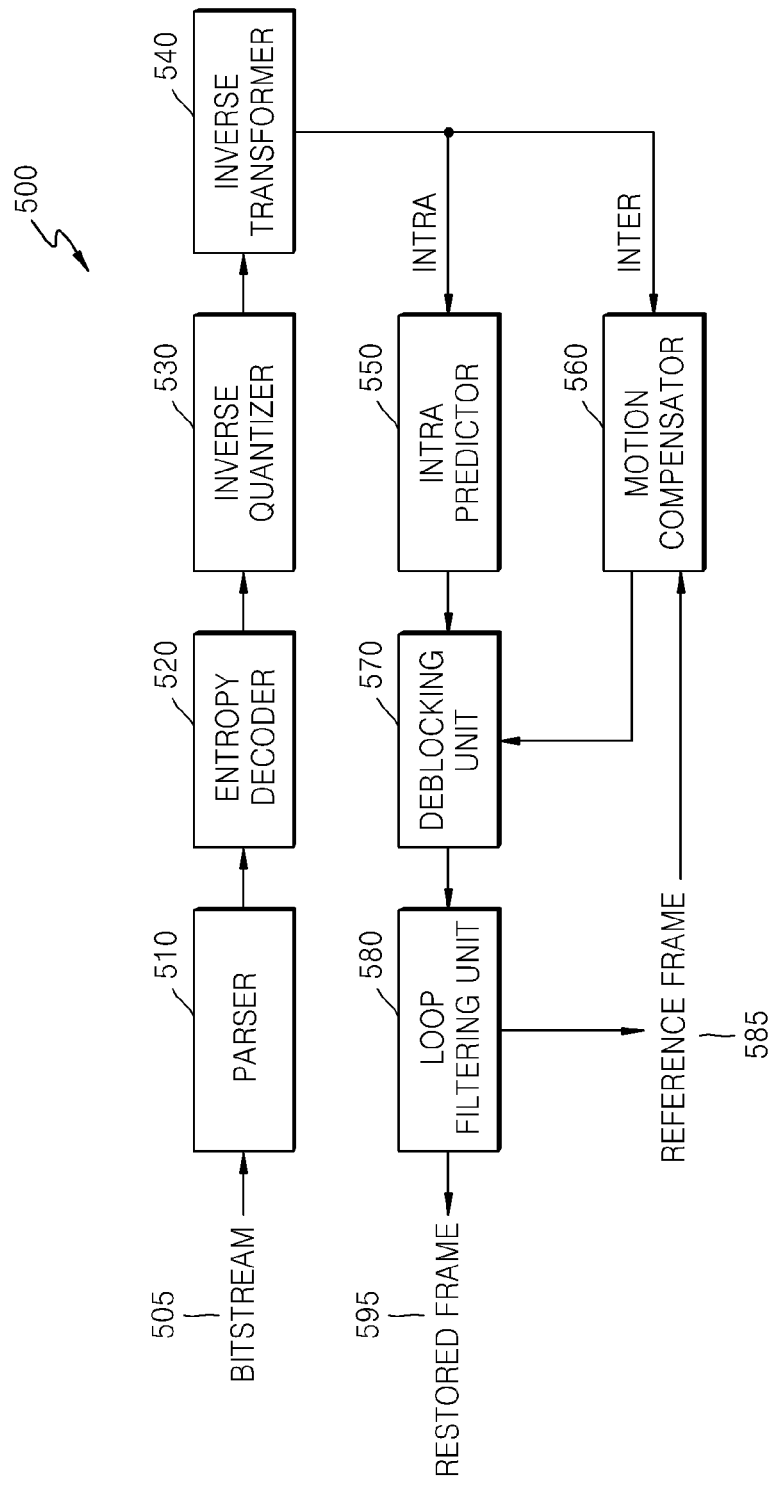
FIG. 17 is a block diagram of an image decoder based on coding units, according to an exemplary embodiment.

FIG. 17 is a block diagram of an image decoder 500 based on coding units, according to an exemplary embodiment.

Referring to FIG. 17, a parser 510 parses encoded image data to be decoded and information about encoding used for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

Specifically, the intra prediction 550 and the motion compensator 560 need to determine partitions and a prediction mode for each of the coding units having a tree structure, and the inverse transformer 540 need to determine a size of a transformation unit for each coding unit.

Figure 18:
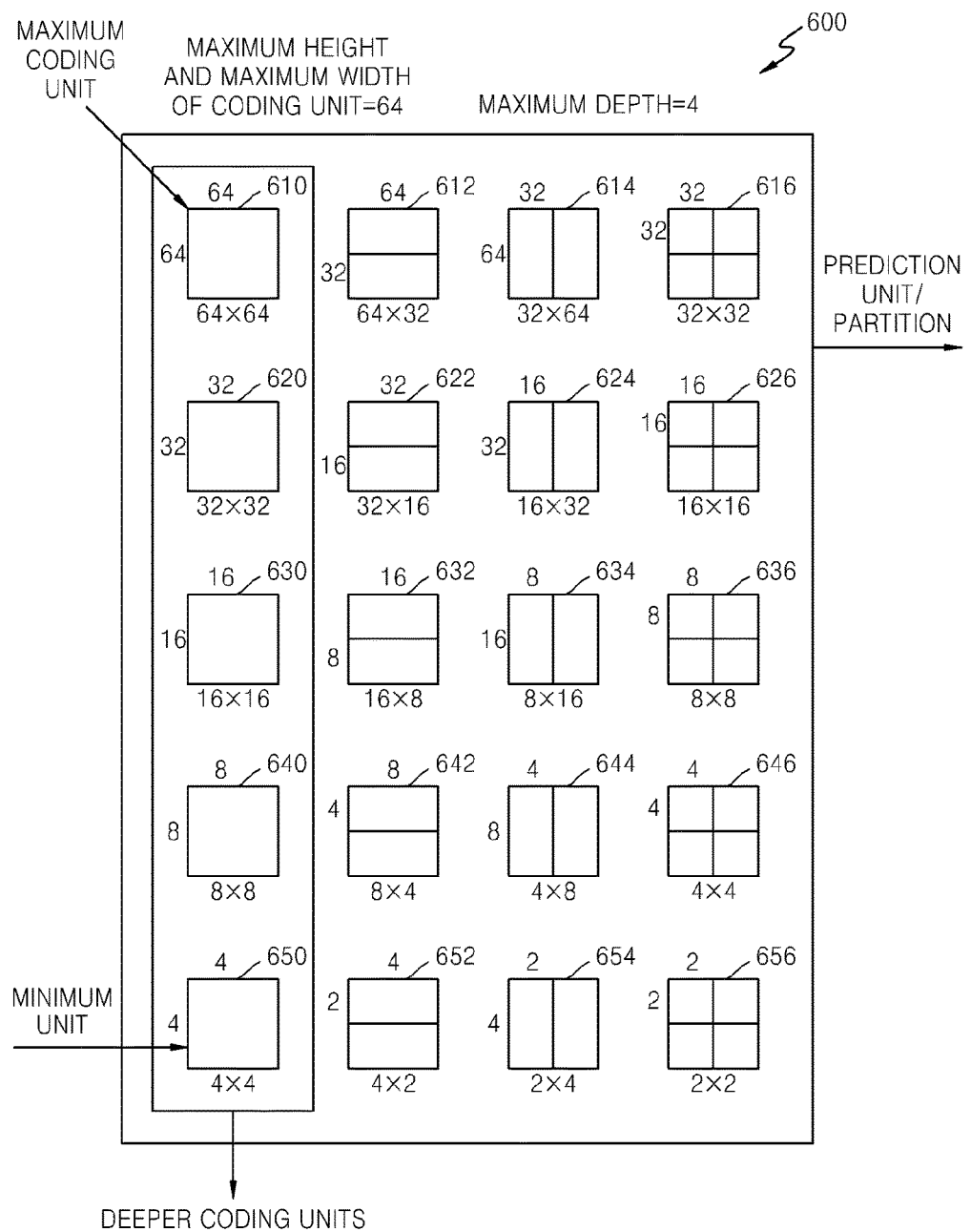
FIG. 18 is a diagram illustrating deeper coding units according to depths, and partitions, according to an exemplary embodiment.

FIG. 18 is a diagram illustrating deeper coding units according to depths, and partitions, according to an exemplary embodiment.

A video encoding apparatus 100 and a video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to a predetermined maximum size of the coding unit.

In a hierarchical structure 600 of coding units, the maximum height and the maximum width of the coding units are each 64, and the maximum depth is 4. Here, the maximum depth indicates a total number of splits from a maximum coding unit to a minimum coding unit. Since a depth increases along a vertical axis of the hierarchical structure 600, a height and a width of the deeper coding units are each split. Also, a prediction unit and partitions, which are bases for prediction encoding of each deeper coding unit, are shown along a horizontal axis of the hierarchical structure 600.

For example, a first coding unit 610 is a maximum coding unit in the hierarchical structure 600, wherein a depth thereof is 0 and a size, i.e., a height by width, thereof is 64×64. The depth increases along the vertical axis such that the hierarchical structure 600 includes a second coding unit 620 having a size of 32×32 and a depth of 1, a third coding unit 630 having a size of 16×16 and a depth of 2, and a fourth coding unit 640 having a size of 8×8 and a depth of 3. The fourth coding unit 640 having the size of 8×8 and the depth of 3 is a minimum coding unit.

The prediction unit and the partitions of the coding units 610, 620, 630, 640 and 650 are arranged along the horizontal axis according to each depth. In other words, if the first coding unit 610 having the size of 64×64 and the depth of 0 is a prediction unit, the prediction unit may be split into partitions included in the first coding unit 610, i.e., a partition 610 having a size of 64×64, partitions 612 having a size of 64×32, partitions 614 having the size of 32×64, or partitions 616 having a size of 32×32.

Similarly, a prediction unit of the second coding unit 620 having the size of 32×32 and the depth of 1 may be split into partitions included in the second coding unit 620, i.e., a partition 620 having a size of 32×32, partitions 622 having a size of 32×16, partitions 624 having a size of 16×32, and partitions 626 having a size of 16×16.

Similarly, a prediction unit of the third coding unit 630 having the size of 16×16 and the depth of 2 may be split into partitions included in the third coding unit 630, i.e., a partition having a size of 16×16 included in the third coding unit 630, partitions 632 having a size of 16×8, partitions 634 having a size of 8×16, and partitions 636 having a size of 8×8.

Similarly, a prediction unit of the fourth coding unit 640 having the size of 8×8 and the depth of 3 may be split into partitions included in the fourth coding unit 640, i.e., a partition having a size of 8×8 included in the fourth coding unit 640, partitions 642 having a size of 8×4, partitions 644 having a size of 4×8, and partitions 646 having a size of 4×4.

Similarly, a prediction unit of the fourth coding unit 650 having the size of 4×4 and the depth of 4 may be split into partitions included in the fourth coding unit 650, i.e., a partition having a size of 4×4 included in the fourth coding unit 650, partitions 652 having a size of 4×2, partitions 654 having a size of 2×4, and partitions 656 having a size of 2×2.

In order to determine the at least one coded depth of the coding units of the maximum coding unit 610, the coding unit determiner 120 of the video encoding apparatus 100 is required to perform encoding for coding units corresponding to each depth included in the maximum coding unit 610.

A total number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be selected for the current depth by performing encoding for each prediction unit in the coding units corresponding to the current depth, along the horizontal axis of the hierarchical structure 600. Alternatively, the minimum encoding error may be searched for by comparing the minimum encoding errors according to depths, by performing encoding for each depth as the depth increases along the vertical axis of the hierarchical structure 600. A depth and a partition having the minimum encoding error in the first coding unit 610 may be selected as the coded depth and a partition type of the first coding unit 610.

FIG. 19 is a diagram for describing a relationship between a coding unit 710 and transformation units 720, according to an exemplary embodiment.

The video encoding apparatus 100 and a video decoding apparatus 200 encode and decode, respectively, an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding errors may be selected.

FIG. 20 is a diagram for describing encoding information of coding units corresponding to a coded depth, according to an exemplary embodiment.

The output unit 130 of a video encoding apparatus 100 may encode and transmit first information 800 about a partition type, second information 810 about a prediction mode, and third information 820 about a size of a transformation unit for each coding unit corresponding to a coded depth, as information about an encoding mode.

The first information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the first information 800 about a partition type is set to indicate one of the partition 804 having a size of 2N×N, the partition 806 having a size of N×2N, and the partition 808 having a size of N×N The second information 810 indicates a prediction mode of each partition. For example, the second information 810 may indicate a mode of prediction encoding performed on a partition indicated by the first information 800, i.e., an intra mode 812, an inter mode 814, or a skip mode 816.

The third information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

An image data and encoding information extractor 220 of a video decoding apparatus 200 may extract and use the information 800, 810, and 820 for decoding, according to each deeper coding unit.

Figure 21:
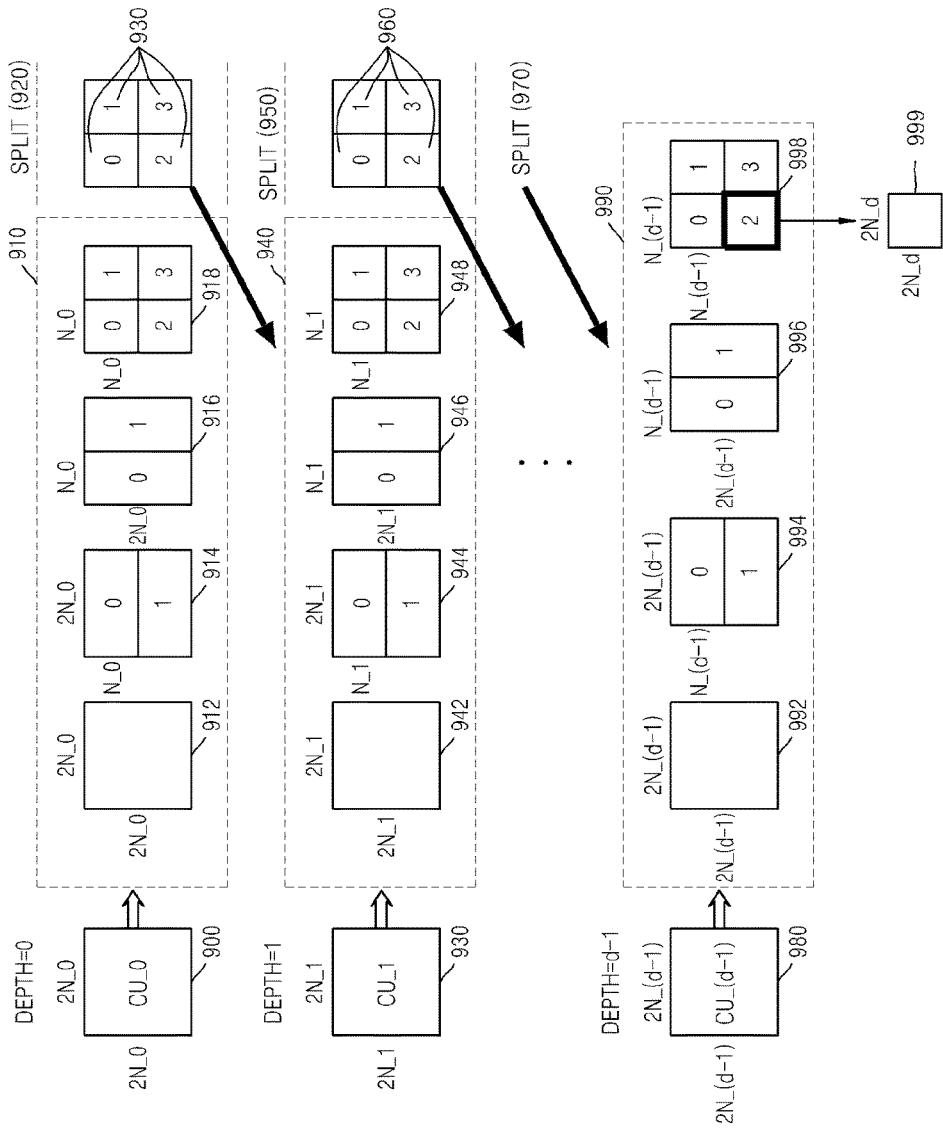
FIG. 21 is a diagram of deeper coding units according to depths, according to an exemplary embodiment.

FIG. 21 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0× N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but it is understood that a partition type is not limited thereto in another embodiment. For example, the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the minimum encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, the coding unit according to each depth may be performed up to when a depth becomes d−1, and split information may be encoded up to when a depth is one of 0 to d−2. For example, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units of a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be considered a minimum unit for the current maximum coding unit. A minimum unit may be a rectangular data unit obtained by splitting a minimum coding unit 980 by 4. By performing the encoding repeatedly, a video encoding apparatus 100 may select a depth having the minimum encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding errors may be determined as a coded depth. At least one of the coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth are set to 1.

An image data and encoding information extractor 220 of a video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 22:
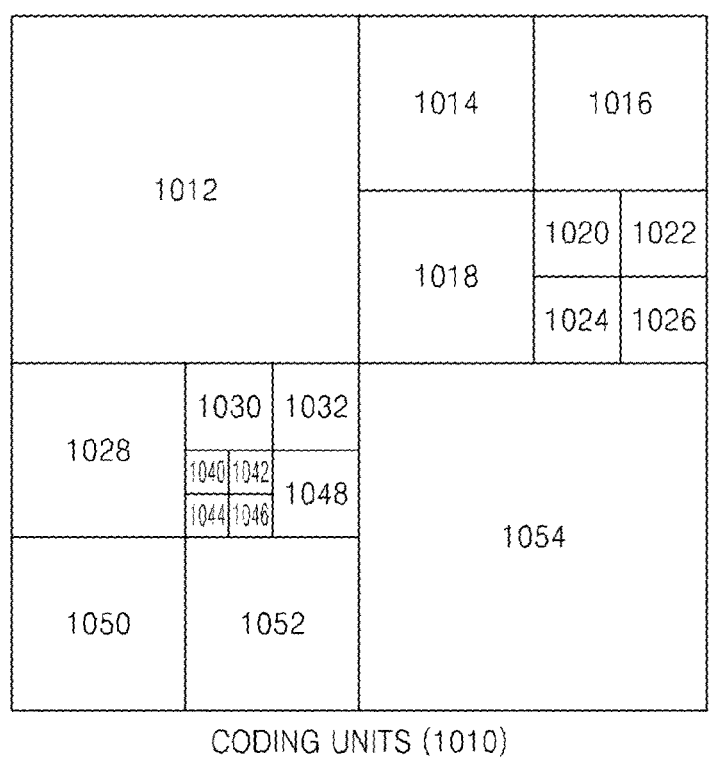
FIGS. 22 through 24 are diagrams for describing a relationship between coding units, prediction units, and transformation units, according to an exemplary embodiment.
Figure 23:
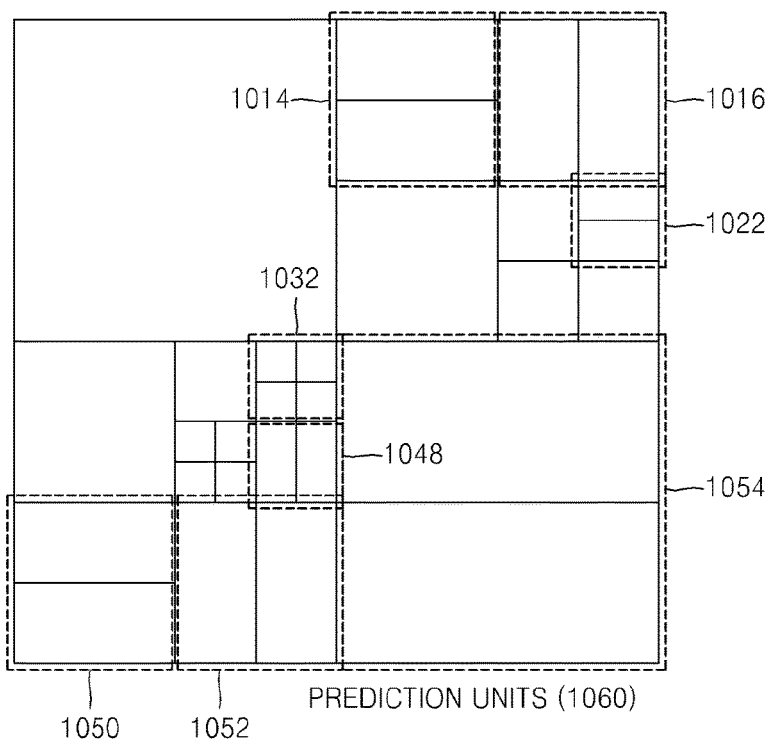
Figure 24:
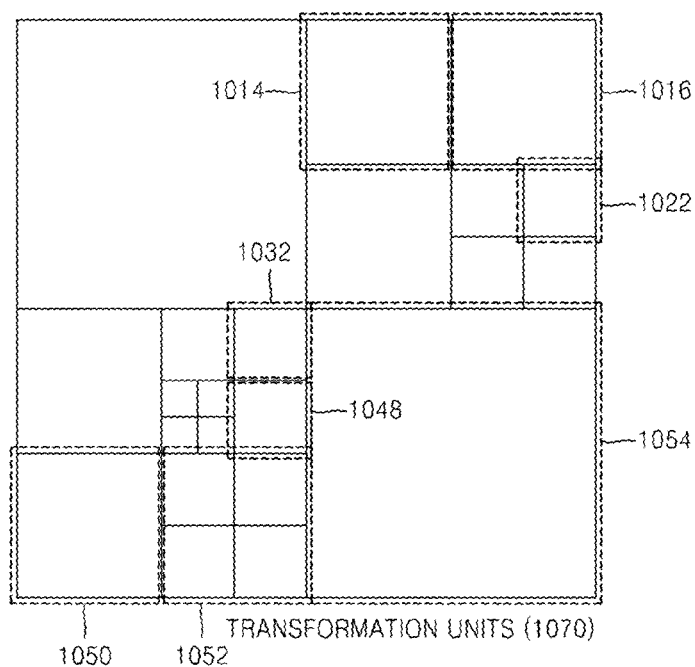

FIGS. 22 through 24 are diagrams for describing a relationship between coding units 1010, prediction units 1060, and transformation units 1070, according to an exemplary embodiment.

The coding units 1010 are coding units having a tree structure, corresponding to coded depths determined by a video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units of the coding units 1010. For example, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. For example, video encoding and decoding apparatuses 100 and 200 may perform intra prediction, motion estimation, motion compensation, transformation, and inverse-transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include at least one of split information about a coding unit, information about a partition type, information about a prediction mode, and information about a size of a transformation unit. Table 1 shows exemplary encoding information that may be set by the video encoding and decoding apparatuses 100 and 200.

the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

TABLE 1

Split Information 0
(Encoding on Coding Unit having Size of 2N × 2N and Current Depth of d)

| | | | Size of Transformation Unit | | |
|---|---|---|---|---|---|
| | Partition Type | | Split Information 0 | Split Information 1 | |
| Prediction Mode | Symmetrical Partition Type | Asymmetrical Partition Type | of Transformation Unit | of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth in which a current coding unit is no longer split into a lower depth is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N x N, which are obtained by symmetrically splitting at least one of a height and a width of a prediction unit, and asymmetrical partition types having sizes of 2N x nU, 2N x nD, nL×2N, and nR×2N (where the variables "n", "U", "D", "L" and "R" are positive integers), which are obtained by asymmetrically splitting at least one of the height and the width of the prediction unit. The asymmetrical partition types having the sizes of 2N x nU and 2N x nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. For example, if split information of the transformation unit is 0, The encoding information about coding units having a tree structure may include at least one of a coding unit corresponding to a coded depth, a prediction unit, and a minimum unit. The coding unit corresponding to the coded depth may include at least one of a prediction unit and a minimum unit including the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Therefore, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit are searched using encoded information of the data units, and the searched adjacent coding units may be referred to for predicting the current coding unit.

Figure 25:
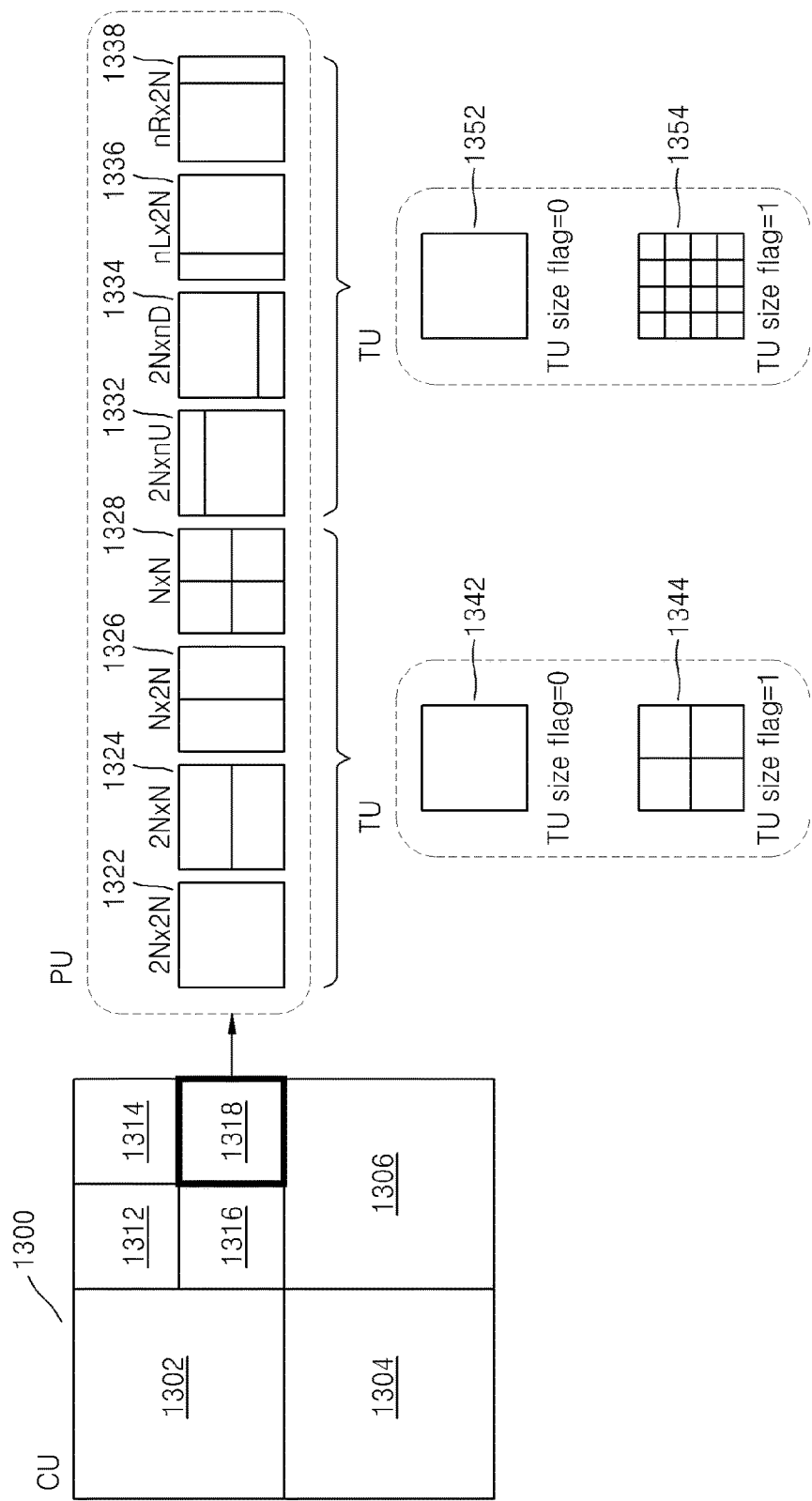
FIG. 25 is a diagram for describing a relationship between a coding unit, a prediction unit or a partition, and a transformation unit, according to encoding mode information of Table 1 according to an exemplary embodiment.

FIG. 25 is a diagram for describing a relationship between a coding unit, a prediction unit or a partition, and a transformation unit, according to encoding mode information of Table 1 according to an exemplary embodiment.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, or a partition type 1338 having a size of nR×2N.

Transformation-unit split information TU size flag may be one of transform indexes, and a size of the transformation unit that corresponds to the transform index may be changed according to a prediction unit type or a partition type of the coding unit.

For example, when the partition type is set to be symmetrical, i.e., the partition type 1322, 1324, 1326, or 1328, a transformation unit 1342 having a size of 2N×2N is set if the transformation-unit split information is 0, and a transformation unit 1344 having a size of N×N is set if the transformation-unit split information is 1.

When the partition type is set to be asymmetrical, i.e., the partition type 1332, 1334, 1336, or 1338, a transformation unit 1352 having a size of 2N×2N is set if the transformation-unit split information is 0, and a transformation unit 1354 having a size of N/2×N/2 is set if the transformation-unit split information is 1.

Referring to FIG. 21, the transformation-unit split information TU size flag is a flag having a value or 0 or 1, though it is understood that another embodiment is not limited to a 1-bit flag, and a transformation unit may be hierarchically split having a tree structure while the transformation-unit split information increases from 0 in another embodiment. The transformation-unit split information may be used as an embodiment of the transform index.

In this case, when the transformation-unit split information is used together with a maximum size of a transformation unit and a minimum size thereof, the size of an actually used transformation unit may be represented. The video encoding apparatus 100 may encode size information of a maximum transformation unit, size information of a minimum transformation unit, and maximum split information of a transformation unit. The encoded size information of the maximum transformation unit, the encoded size information of the minimum transformation unit, and the maximum split information of a transformation unit may be inserted into the SPS. The video decoding apparatus 200 may perform video decoding by using the size information of the maximum transformation unit, the size information of the minimum transformation unit, and the maximum split information of a transformation unit.

For example, when a current coding unit has a size of 64×64, a maximum transformation unit has a size of 32×32, and transformation-unit split information is 0, a transformation unit may be set to have a size of 32×32. When the current encoding unit has a size of 64×64, the maximum transformation unit has a size of 32×32, and the transformation-unit split information is 1, the transformation unit may be set to have a size of 16×16. When the current encoding unit has a size of 64×64, the maximum transformation unit has a size of 32×32, and the transformation-unit split information is 2, the transformation unit may be set to have a size of 8×8.

For example, when the current coding unit has a size of 32×32, a minimum transformation unit has a size of 32×32, and the transformation-unit split information is 0, the transformation unit may be set to have a size of 32×32. Since the size of the transformation unit cannot be smaller than 32×32, no transformation-unit split information can be set.

For example, when the current encoding unit has a size of 64×64 and maximum split information of a transformation unit is 1, the transformation-unit split information may be 0 or 1, and other transformation-unit split information cannot be set.

Accordingly, when the maximum split information of a transformation unit is defined as 'MaxTransformSizeIndex', the size of the minimum transformation unit is defined as 'MinTransformSize', and the size of a transformation unit when the transformation-unit split information is 0 is defined as 'RootTuSize', a minimum transformation unit size possible at a current coding unit, 'CurrMinTuSize', may be defined as the following relationship Equation (3):

$$\text{CurrMinTuSize} = \max(\text{MinTransformSize}, \text{RootTuSize}/(2^{\wedge}\text{MaxTransformSizeIndex})) \quad (3)$$

In comparison with the minimum transformation unit size possible at a current coding unit, 'CurrMinTuSize', the transformation unit size when the TU size flag is 0, 'RootTuSize', may represent a maximum transformation unit size that can be employed by a system. In other words, according to the relationship Equation (1), since 'RootTuSize/(2^MaxTransformSizeIndex)' denotes a transformation unit size obtained by splitting the transformation unit size when the transformation-unit split information is 0, 'RootTuSize', by a number of times corresponding to the maximum split information of a transformation unit, and 'MinTransformSize' denotes a minimum transformation unit size, a smaller size from among the two sizes may be the minimum transformation unit size possible at the current coding unit, 'CurrMinTuSize'.

The current maximum transformation unit size RootTuSize may vary depending on the type of prediction mode.

For example, when a current prediction mode is an inter mode, RootTuSize may be determined according to relationship Equation (4) below, where 'MaxTransformSize' indicates a maximum transformation unit size and 'PUSize' indicates a current prediction unit size:

$$\text{RootTuSize} = \min(\text{MaxTransformSize}, \text{PUSize}) \quad (4)$$

In other words, when the current prediction mode is an inter mode, the transformation unit size when the transformation-unit split information is 0, 'RootTuSize', may be set to be a smaller size from among the maximum transformation unit size and the current prediction unit size.

When a prediction mode of a current partition unit is an intra mode, 'RootTuSize' may be determined according to relationship Equation (5) below, where 'PartitionSize' indicates the size of the current partition unit:

$$\text{RootTuSize} = \min(\text{MaxTransformSize}, \text{PartitionSize}) \quad (5)$$

In other words, when the current prediction mode is an intra mode, the transformation unit size when the transformation-unit split information is 0, 'RootTuSize', may be set to be a smaller size from among the maximum transformation unit size and the current partition unit size.

However, it should be noted that a current maximum transformation unit size 'RootTuSize' that varies according to the prediction mode of a partition unit is only an embodiment, and that a factor for determining the current maximum transformation unit size 'RootTuSize' is not limited to the embodiment.

Figure 26:
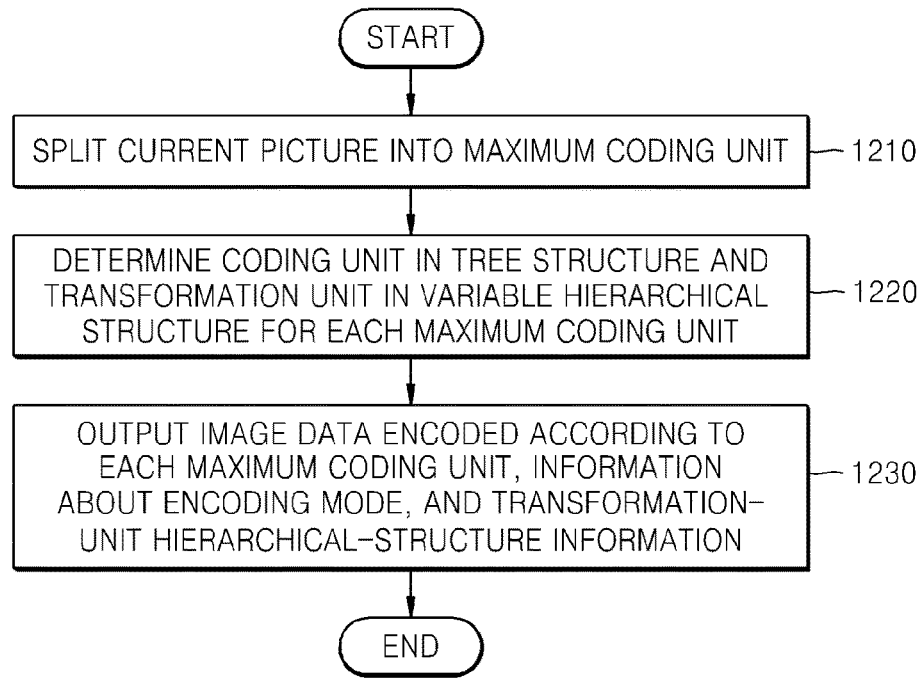
FIG. 26 is a flowchart illustrating a video encoding method using a coding unit in a tree structure and a transformation unit in a variable tree-structure, according to an exemplary embodiment.

FIG. 26 is a flowchart illustrating a video encoding method using a coding unit in a tree structure and a transformation unit in a variable tree-structure, according to an exemplary embodiment.

In operation 1210, a current picture is split into at least one maximum coding unit. A maximum depth indicating a total number of possible splitting splits may be set in advance.

In operation 1220, at least one split region obtained by splitting a region of the maximum coding unit according to depths is encoded, so that a coded depth to output a final encoding result is determined for each at least one split region and the coding unit in the tree structure and the transformation unit in the variable tree-structure are determined.

The maximum coding unit is spatially split whenever the depth increases, and thus is split into coding units of a lower depth. Each coding unit may be split into coding units of another lower depth by being spatially split independently from adjacent coding units. Encoding is repeatedly performed on each coding unit according to depths.

Also, partition types and transformation units having a minimum encoding error are determined for each deeper coding unit. In order to determine a coded depth having a minimum encoding error in each maximum coding unit, encoding errors may be measured and compared in all deeper coding units according to depths.

When each coding unit is determined, a transformation unit for transformation of the coding unit may be determined. The transformation unit may be determined as a data unit that minimizes an error caused by transforming the coding unit. As a result of performing a transformation based on levels according to transformation depths in a current coding unit, a transformation unit in a tree structure which is independent from another transformation unit in an adjacent region and which forms a hierarchical structure with transformation units according to depths in the same region may be determined.

Also, a maximum split level of the transformation unit may be previously set for each maximum coding unit or each coding unit. According to a maximum split level of the current coding unit, a transformation may be performed by using transformation units in a variable tree-structure including a base transformation unit through a minimum transformation unit which are allowed for the current coding unit. Transformation units with a transformation depth which output an encoding result having a minimum error may be determined from the transformation units in the variable tree-structure with respect to the current coding unit, so that the transformation units in the tree structure may be determined.

In operation 1230, image data being a final result of the encoding of at least one split region of each maximum coding unit is output, with encoded information about a coded depth and an encoding mode. The encoded information about the encoding mode may include information about a coded depth or split information, information about a partition type of a prediction unit, and a prediction mode, and transformation-unit hierarchical-structure information. The encoded information about the encoding mode may be transmitted to a decoder with the encoded image data.

Figure 27:
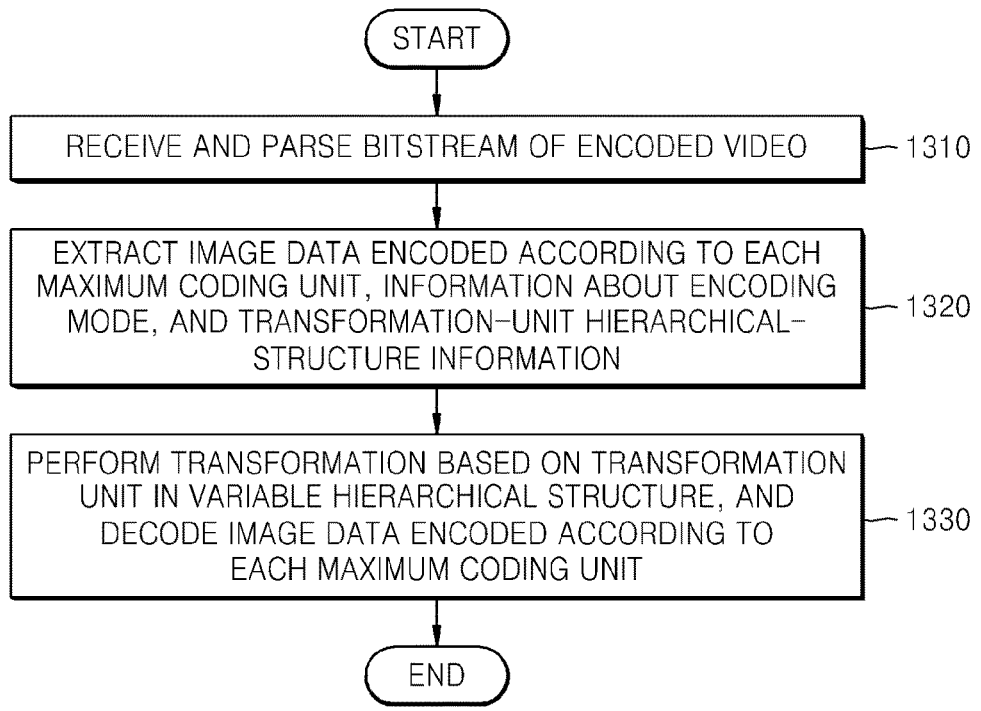
FIG. 27 is a flowchart illustrating a video decoding method using a coding unit in a tree structure and a transformation unit in a variable tree-structure, according to an exemplary embodiment.

FIG. 27 is a flowchart illustrating a video decoding method using a coding unit in a tree structure and a transformation unit in a variable tree-structure, according to an exemplary embodiment.

In operation 1310, a bitstream of an encoded video is received and parsed.

In operation 1320, encoded image data of a current picture assigned to a maximum coding unit is acquired from the parsed bitstream, and information about a coded depth and an encoding mode according to maximum coding units are extracted from the parsed bitstream. The coded depth of each maximum coding unit is a depth having a minimum encoding error in each maximum coding unit. In encoding each maximum coding unit, the image data is encoded based on at least one data unit obtained by hierarchically splitting each maximum coding unit according to depths.

According to the information about the coded depth and the encoding mode, the maximum coding unit may be split into coding units having a tree structure. Each of the coding units having the tree structure is determined as a coding unit corresponding to a coded depth, and is optimally encoded as to output the minimum encoding error. Accordingly, encoding and decoding efficiency of an image may be improved by decoding each piece of encoded image data in the coding units having a tree structure after determining at least one coded depth according to coding units.

Also, according to extracted transformation-unit hierarchical-structure information, the transformation unit in the tree structure may be determined in the coding unit. For example, a total number of levels from a base transformation unit to a transformation unit at a lowermost level which are allowed for a current coding unit may be read based on the transformation-unit maximum split information. Alternatively, the total number of levels from the base transformation unit to the transformation unit at the lowermost level may be determined based on a maximum split level that is set in advance between encoding and decoding systems.

The base transformation unit may be variously determined according to an encoding mode based on a pre-set scheme. Thus, transformation units in a variable tree-structure with respect to the current coding unit may be determined based on the transformation-unit maximum split information, and a transformation unit with a transformation depth to be used in inverse-transformation with respect to the current coding unit may be determined from among the transformation units in the variable tree-structure.

In operation 1330, the encoded image data of each maximum coding unit is decoded based on the information about a coded depth and an encoding mode according to maximum coding units. In this regard, the inverse-transformation may be performed on the current coding unit by using the transformation unit that is determined from among the transformation units in the variable tree-structure while decoding is performed on the current coding unit based on the information about a coded depth and an encoding mode. As decoding is performed on each coding unit and each maximum coding unit, image data of a spatial region may be restored and then a picture and a video that is a picture sequence may be restored. The restored video may be reproduced by a reproducing apparatus, may be stored in a storage medium, or may be transmitted via a network.

Exemplary embodiments may be written as computer programs and can be implemented in general-use digital computers that execute the programs using a computer readable recording medium. In addition, a data structure used in an exemplary embodiment can be written in a computer readable recording medium through various means. Examples of the computer readable recording medium include magnetic storage media (e.g., ROM, floppy disks, hard disks, etc.), optical recording media (e.g., CD-ROMs, or DVDs), etc.

While the inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description but by the appended claims.

The invention claimed is:
1. A video decoding method, performed by at least one processing device, the method comprising:
obtaining, from a bitstream, maximum split information for an intra mode, maximum split information for an inter mode, information about a prediction mode for a coding unit and partition mode information for the coding unit in the intra mode, the partition mode information indicating whether at least one prediction unit is determined by halving a height and a width of the coding unit in the intra mode;
determining the at least one prediction unit by splitting the coding unit based on at least one of the prediction mode and the partition mode information;
generating prediction data of the coding unit by performing prediction based on the at least one prediction unit;
when the information about the prediction mode indicates that the coding unit is predicted according to the intra mode, determining a maximum split level of a transformation unit based on the maximum split information for the intra mode and whether the partition mode information indicates N×N or 2N×2N;
when the information about the prediction mode indicates that the coding unit is predicted according to the inter mode, determining a maximum split level of a transformation unit based on the maximum split information for the inter mode;
when a current split level of a current transformation unit determined from the coding unit is less than the maximum split level, obtaining sub-split information about the current transformation unit from the bitstream;
when the sub-split information indicates a split of the current transformation unit, splitting the current transformation unit into four square transformation units of a next split level by halving a height and a width of the current transformation unit, wherein the next split level is greater than the current split level;
performing inverse-transformation on the current transformation unit to generate residual data corresponding to the current transformation unit; and
reconstructing the coding unit by using the prediction data and the residual data.

2. The video decoding method of claim 1, wherein the maximum split information indicates a maximum number of available splits for generating the transformation unit by splitting the coding unit.

3. The video decoding method of claim 1, wherein the maximum split information for the intra mode is obtained as parameters with respect to one data level from among data levels comprising a picture sequence, a picture, a slice, and a data unit for encoding a video.

4. The video decoding method of claim 1, wherein a minimum size of the transformation unit determined from the coding unit based on the maximum split level of the transformation unit is not less than a minimum size of a transformation unit according to minimum size information of transformation unit obtained from the bitstream or a size of a transformation unit at a lowermost level obtained by splitting the coding unit to the maximum split level.

5. A video encoding method comprising:
generating maximum split information for a coding unit predicted according to an intra mode;
generating maximum split information for a coding unit predicted according to an inter mode;
generating information about a prediction mode for a current coding unit, wherein the information about the prediction mode indicates one of the intra mode and the inter mode;
generating partition mode information for the current coding unit predicted according to the intra mode, wherein the partition mode information indicates whether at least one prediction unit is determined by halving a height and a width of the current coding unit;
when the current coding unit is predicted according to the intra mode, determining a maximum split level of a transformation unit with respect to the current coding unit predicted according to the intra mode based on the maximum split information for the intra mode and whether the partition mode information indicates N×N or 2N×2N;
when the current coding unit is predicted according to the inter mode, determining a maximum split level of a transformation unit with respect to the current coding unit predicted according to an inter mode;
generating sub-split information for a current transformation unit when a current split level of the current transformation unit determined from the current coding unit is less than the maximum split level; and
generating quantized transformation coefficients of the current transformation unit,
wherein when the current transformation unit is split into a next split level of transformation units, the sub-split information is generated for indicating a split of the current transformation unit, wherein the next split level is greater than the current split level.

6. A video encoding method comprising:
generating maximum split information for a coding unit predicted according to an intra mode;
generating information about a prediction mode for a current coding unit, wherein the information about the prediction mode indicates one of the intra mode and an inter mode;
generating partition mode information for the current coding unit predicted according to the intra mode, wherein the partition mode information indicates whether at least one prediction unit is determined by halving a height and a width of the current coding unit;
when the current coding unit is predicted according to the intra mode, determining a maximum split level of a transformation unit with respect to the current coding unit predicted according to the intra mode based on the maximum split information for the intra mode and whether the partition mode information indicates N×N or 2N×2N;
generating sub-split information for a current transformation unit when a current split level of the current transformation unit determined from the current coding unit is less than the maximum split level; and
generating quantized transformation coefficients of the current transformation unit,
wherein when the current transformation unit is split into a next split level of transformation units, the sub-split information is generated for indicating a split of the current transformation unit, wherein the next split level is greater than the current split level.

7. A video encoding method comprising:
generating maximum split information for a coding unit predicted according to an intra mode;
generating maximum split information for a coding unit predicted according to an inter mode;

generating information about a prediction mode for a current coding unit, wherein the information about the prediction mode indicates one of the intra mode and the inter mode;

generating partition mode information for the current coding unit predicted according to the intra mode, wherein the partition mode information indicates whether at least one prediction unit is determined by halving a height and a width of the current coding unit;

when the current coding unit is predicted according to the intra mode, determining a maximum split level of a transformation unit with respect to the current coding unit predicted according to the intra mode based on the maximum split information for the intra mode and whether the partition mode information indicates N×N or 2N×2N;

when the current coding unit is predicted according to the inter mode, determining a maximum split level of a transformation unit with respect to the current coding unit predicted according to an inter mode;

generating sub-split information for a current transformation unit when a current split level of the current transformation unit determined from the current coding unit is less than the maximum split level; and generating quantized transformation coefficients of the current transformation unit, wherein when the current transformation unit is not split into a next split level of transformation units, the sub-split information is generated for indicating a non-split of the current transformation unit.

8. A video encoding method comprising:

generating maximum split information for a coding unit predicted according to an intra mode;

generating information about a prediction mode for a current coding unit, wherein the information about the prediction mode indicates one of the intra mode and an inter mode;

generating partition mode information for the current coding unit predicted according to the intra mode, wherein the partition mode information indicates whether at least one prediction unit is determined by halving a height and a width of the current coding unit;

when the current coding unit is predicted according to the intra mode, determining a maximum split level of a transformation unit with respect to the current coding unit predicted according to the intra mode based on the maximum split information for the intra mode and whether the partition mode information indicates N×N or 2N×2N;

generating sub-split information for a current transformation unit when a current split level of the current transformation unit determined from the current coding unit is less than the maximum split level; and generating quantized transformation coefficients of the current transformation unit, wherein when the current transformation unit is not split into a next split level of transformation units, the sub-split information is generated for indicating a non-split of the current transformation unit.

9. A video encoding method comprising:

generating maximum split information for a coding unit predicted according to an intra mode;

generating maximum split information for a coding unit predicted according to an inter mode;

generating information about a prediction mode for a current coding unit, wherein the information about the prediction mode indicates one of the intra mode and the inter mode;

generating partition mode information for the current coding unit predicted according to the intra mode, wherein the partition mode information indicates whether at least one prediction unit is determined by halving a height and a width of the current coding unit;

when the current coding unit is predicted according to the intra mode, determining a maximum split level of a transformation unit with respect to the current coding unit predicted according to the intra mode based on the maximum split information for the intra mode and whether the partition mode information indicates N×N or 2N×2N;

when the current coding unit is predicted according to the inter mode, determining a maximum split level of a transformation unit with respect to the current coding unit predicted according to an inter mode based on the maximum split information for the inter mode;

generating sub-split information for a current transformation unit when a current split level of the current transformation unit determined from the current coding unit is less than the maximum split level; and generating quantized transformation coefficients of the current transformation unit.

10. A non-transitory computer-readable medium for recording a bitstream, the bitstream comprising:

maximum split information for a coding unit predicted according to an intra mode;

maximum split information for a coding unit predicted according to an inter mode;

information about a prediction mode for a current coding unit, wherein the information about the prediction mode indicates one of the intra mode and the inter mode;

partition mode information for the current coding unit predicted according to the intra mode, wherein the partition mode information indicates whether at least one prediction unit is determined by halving a height and a width of the current coding unit;

sub-split information for a current transformation unit determined from the current coding unit; and quantized transformation coefficients of the current transformation unit, wherein when the current coding unit is predicted according to the intra mode, a maximum split level of a transformation unit with respect to the current coding unit predicted according to the intra mode is determined based on the maximum split information for the intra mode and whether the partition mode information indicates N×N or 2N×2N, wherein when the current coding unit is predicted according to the inter mode, a maximum split level of a transformation unit with respect to the current coding unit predicted according to an inter mode is determined based on the maximum split information for the inter mode, wherein the sub-split information is generated when a current split level of the current transformation unit is less than the maximum split level, wherein when the current transformation unit is split into a next split level of transformation units, the sub-split information is generated for indicating a split of the current transformation unit, wherein the next split level is greater than the current split level.

11. A non-transitory computer-readable medium for recording a bitstream, the bitstream comprising:
- maximum split information for a coding unit predicted according to an intra mode;
- information about a prediction mode for a current coding unit, wherein the information about the prediction mode indicates one of the intra mode and an inter mode;
- partition mode information for the current coding unit predicted according to the intra mode, wherein the partition mode information indicates whether at least one prediction unit is determined by halving a height and a width of the current coding unit;
- sub-split information for a current transformation unit determined from the current coding unit; and
- quantized transformation coefficients of the current transformation unit,
- wherein when the current coding unit is predicted according to the intra mode, a maximum split level of a transformation unit with respect to the current coding unit predicted according to the intra mode is determined based on the maximum split information for the intra mode and whether the partition mode information indicates N×N or 2N×2N,
- wherein the sub-split information is generated when a current split level of the current transformation unit is less than the maximum split level,
- wherein when the current transformation unit is split into a next split level of transformation units, the sub-split information is generated for indicating a split of the current transformation unit, wherein the next split level is greater than the current split level.

12. A non-transitory computer-readable medium for recording a bitstream, the bitstream comprising:
- maximum split information for a coding unit predicted according to an intra mode;
- maximum split information for a coding unit predicted according to an inter mode;
- information about a prediction mode for a current coding unit, wherein the information about the prediction mode indicates one of the intra mode and the inter mode;
- partition mode information for the current coding unit predicted according to the intra mode, wherein the partition mode information indicates whether at least one prediction unit is determined by halving a height and a width of the current coding unit;
- sub-split information for a current transformation unit determined from the current coding unit; and
- quantized transformation coefficients of the current transformation unit,
- wherein when the current coding unit is predicted according to the intra mode, a maximum split level of a transformation unit with respect to the current coding unit predicted according to the intra mode is determined based on the maximum split information for the intra mode and whether the partition mode information indicates N×N or 2N×2N,
- wherein when the current coding unit is predicted according to the inter mode, a maximum split level of a transformation unit with respect to the current coding unit predicted according to an inter mode is determined based on the maximum split information for the inter mode,
- wherein the sub-split information is generated when a current split level of the current transformation unit is less than the maximum split level,
- wherein when the current transformation unit is not split into a next split level of transformation units, the sub-split information is generated for indicating a non-split of the current transformation unit, wherein the next split level is greater than the current split level.

13. A non-transitory computer-readable medium for recording a bitstream, the bitstream comprising:
- maximum split information for a coding unit predicted according to an intra mode;
- information about a prediction mode for a current coding unit, wherein the information about the prediction mode indicates one of the intra mode and an inter mode;
- partition mode information for the current coding unit predicted according to the intra mode, wherein the partition mode information indicates whether at least one prediction unit is determined by halving a height and a width of the current coding unit;
- sub-split information for a current transformation unit determined from the current coding unit; and
- quantized transformation coefficients of the current transformation unit,
- wherein when the current coding unit is predicted according to the intra mode, a maximum split level of a transformation unit with respect to the current coding unit predicted according to the intra mode is determined based on the maximum split information for the intra mode and whether the partition mode information indicates N×N or 2N×2N,
- wherein the sub-split information is generated when a current split level of the current transformation unit is less than the maximum split level,
- wherein when the current transformation unit is not split into a next split level of transformation units, the sub-split information is generated for indicating a non-split of the current transformation unit, wherein the next split level is greater than the current split level.

14. A non-transitory computer-readable medium for recording a bitstream, the bitstream comprising:
- maximum split information for a coding unit predicted according to an intra mode;
- maximum split information for a coding unit predicted according to an inter mode;
- information about a prediction mode for a current coding unit, wherein the information about the prediction mode indicates one of the intra mode and the inter mode;
- partition mode information for the current coding unit predicted according to the intra mode, wherein the partition mode information indicates whether at least one prediction unit is determined by halving a height and a width of the current coding unit;
- sub-split information for a current transformation unit determined from the current coding unit; and
- quantized transformation coefficients of the current transformation unit,
- wherein when the current coding unit is predicted according to the intra mode, a maximum split level of a transformation unit with respect to the current coding unit predicted according to the intra mode is determined based on the maximum split information for the intra mode and whether the partition mode information indicates N×N or 2N×2N,
- wherein when the current coding unit is predicted according to the inter mode, a maximum split level of a transformation unit with respect to the current coding unit predicted according to an inter mode is determined based on the maximum split information for the inter mode, wherein the sub-split information is generated when a current split level of the current transformation unit is less than the maximum split level.

* * * * *